(12) United States Patent
Takumah

(10) Patent No.: US 11,039,700 B2
(45) Date of Patent: Jun. 22, 2021

(54) SINGLE DOUBLE LEVEL SWIVEL PLATFORM PLATES NOZZLE AND PRESSURIZED CONVOLUTION FORM METHOD TO PROCESS CONVERGENT STRESS ENERGY FLOW IN CYLINDRICAL CONTAINER UNIT

(71) Applicant: Maluki Takumah, Atlanta, GA (US)

(72) Inventor: Maluki Takumah, Atlanta, GA (US)

( * ) Notice: Subject to any disclaimer, the term of this patent is extended or adjusted under 35 U.S.C. 154(b) by 419 days.

(21) Appl. No.: 16/123,376

(22) Filed: Sep. 6, 2018

(65) Prior Publication Data

US 2020/0022514 A1 Jan. 23, 2020

Related U.S. Application Data

(60) Provisional application No. 62/699,854, filed on Jul. 18, 2018.

(51) Int. Cl.
| | | |
|---|---|---|
| *A47G 19/22* | (2006.01) | |
| *A47J 43/09* | (2006.01) | |
| *B01F 5/06* | (2006.01) | |
| *B65D 23/04* | (2006.01) | |
| *B01F 5/10* | (2006.01) | |
| *B65D 1/26* | (2006.01) | |
| *B01F 13/00* | (2006.01) | |

(52) U.S. Cl.
CPC .......... *A47G 19/2255* (2013.01); *A47J 43/09* (2013.01); *B01F 5/069* (2013.01); *B01F 5/108* (2013.01); *B65D 1/265* (2013.01); *B65D 23/04* (2013.01); *B01F 5/066* (2013.01); *B01F 13/002* (2013.01)

(58) Field of Classification Search
CPC .......... B65D 1/265; B65D 1/32; B65D 23/04; B65D 25/06; B65D 35/242; B65D 47/2012; B65D 47/2043; B65D 81/3222; B65D 83/0044; B65D 83/0055; B65D 83/0072; B65D 83/0077; B65D 2217/04; B01F 5/066; B01F 5/0664; B01F 5/068; B01F 5/0683; B01F 5/069; B01F 5/0691; B01F 5/0693; B01F 5/108; B01F 13/0022; B01F 13/002; A47G 19/2255; A47J 43/09
See application file for complete search history.

(56) References Cited

U.S. PATENT DOCUMENTS

| | | | | |
|---|---|---|---|---|
| 5,683,732 A | * | 11/1997 | Baxter | ................ B65D 85/73 |
| | | | | 426/115 |
| 9,650,197 B1 | * | 5/2017 | Efstathiou | .............. B65D 35/10 |
| 9,745,115 B2 | * | 8/2017 | Hall | .................. B65D 81/3211 |
| 2009/0301032 A1 | * | 12/2009 | Sillince | ............. B65D 81/3222 |
| | | | | 53/428 |

(Continued)

*Primary Examiner* — Ryan A Reis
(74) *Attorney, Agent, or Firm* — Silver Legal LLC; Jarrett L. Silver

(57) ABSTRACT

A hand-actuated container used for mixing liquids contains a compression platform with release holes and walls with convolution areas. The convolution areas are convoluted when the container is in a state of compression. These features form a compressible cavity body that, when filled with liquid and compressed, push liquid at high pressure through a nozzle into a liquid reservoir. Vacuum backflow occurs through the release holes and the nozzle as the compressible cavity body returns to its original shape. In some embodiments, a double level platform allows a user to dial in the amount of backflow through the release holes.

20 Claims, 40 Drawing Sheets

(56) References Cited

U.S. PATENT DOCUMENTS

| | | | | |
|---|---|---|---|---|
| 2012/0031277 A1* | 2/2012 | Hsieh | ............... | B65D 51/2835 |
| | | | | 99/289 R |
| 2013/0075287 A1* | 3/2013 | Sharon | ............... | B65D 81/3222 |
| | | | | 206/219 |
| 2015/0321807 A1* | 11/2015 | Cotton | ................... | B65D 51/24 |
| | | | | 220/227 |
| 2016/0038378 A1* | 2/2016 | Al-Hakim | .......... | B65D 81/3211 |
| | | | | 206/221 |
| 2017/0203947 A1* | 7/2017 | James | ................. | B67D 1/0016 |

* cited by examiner

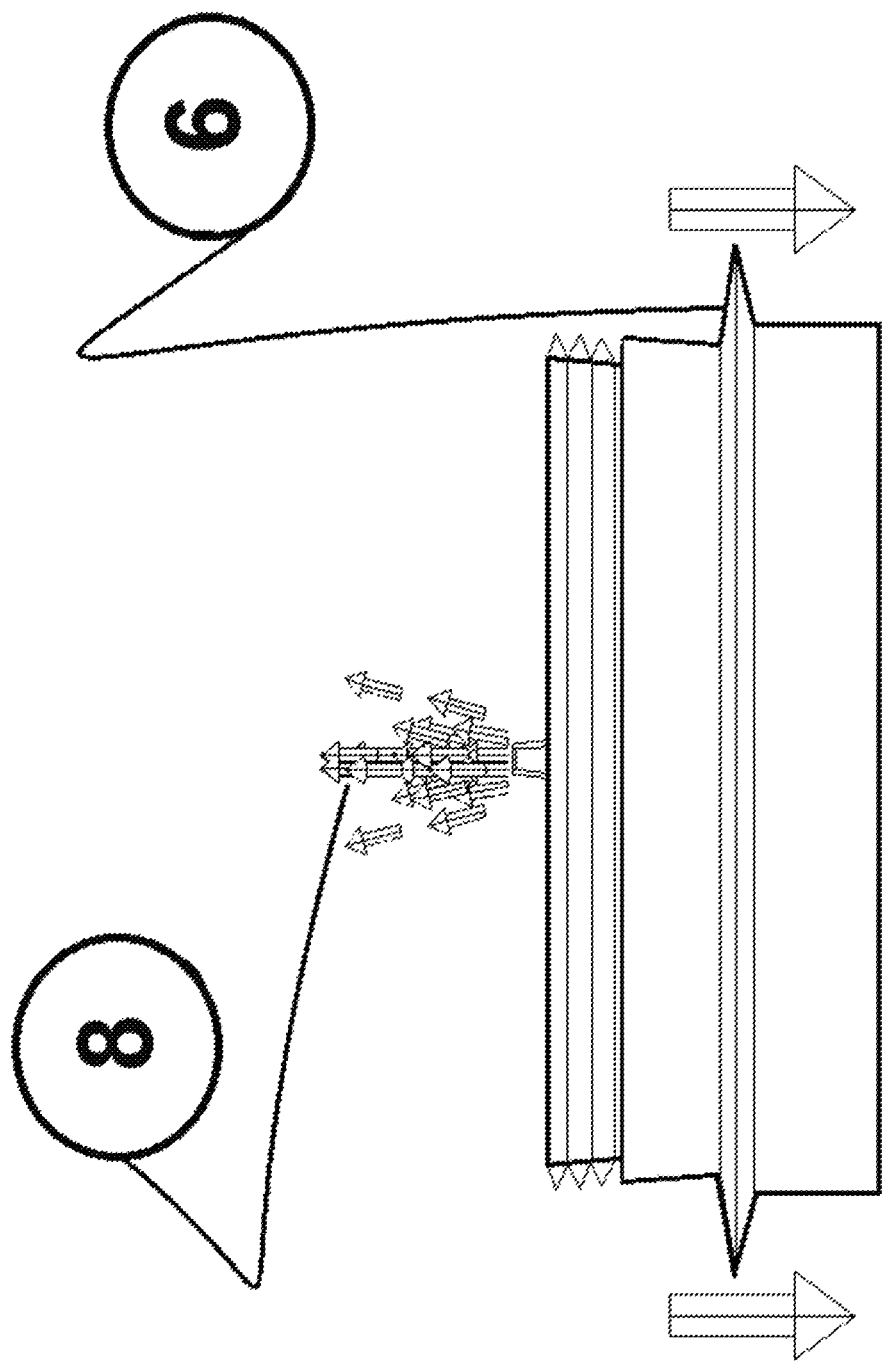

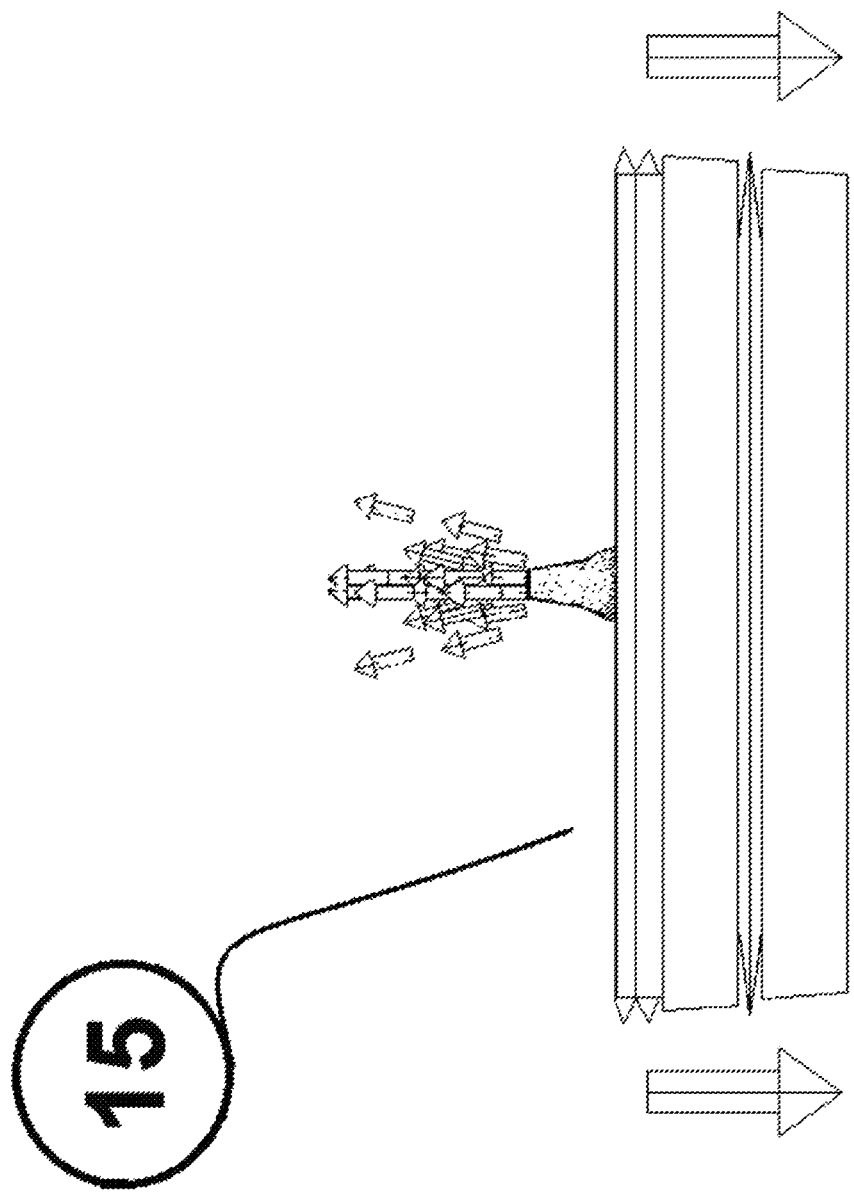

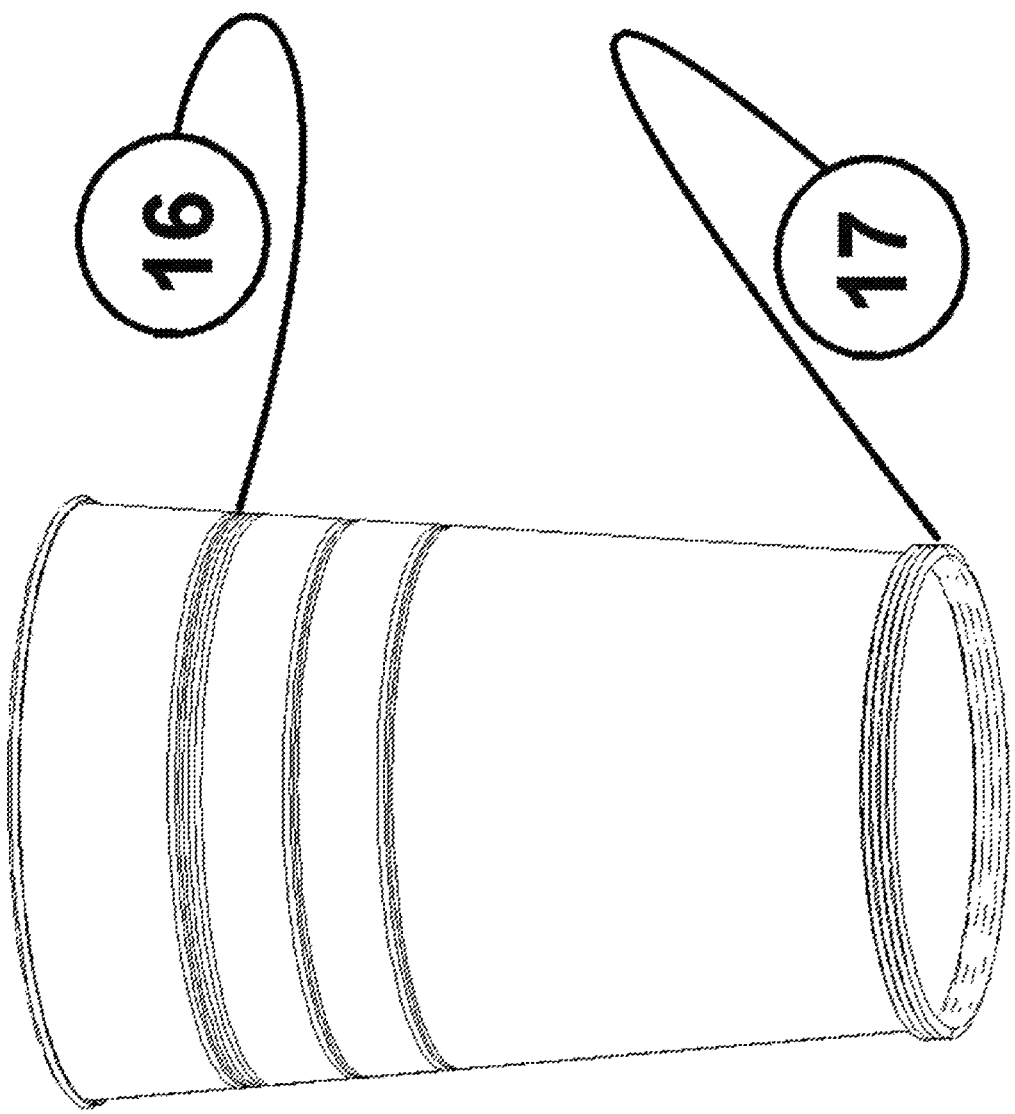

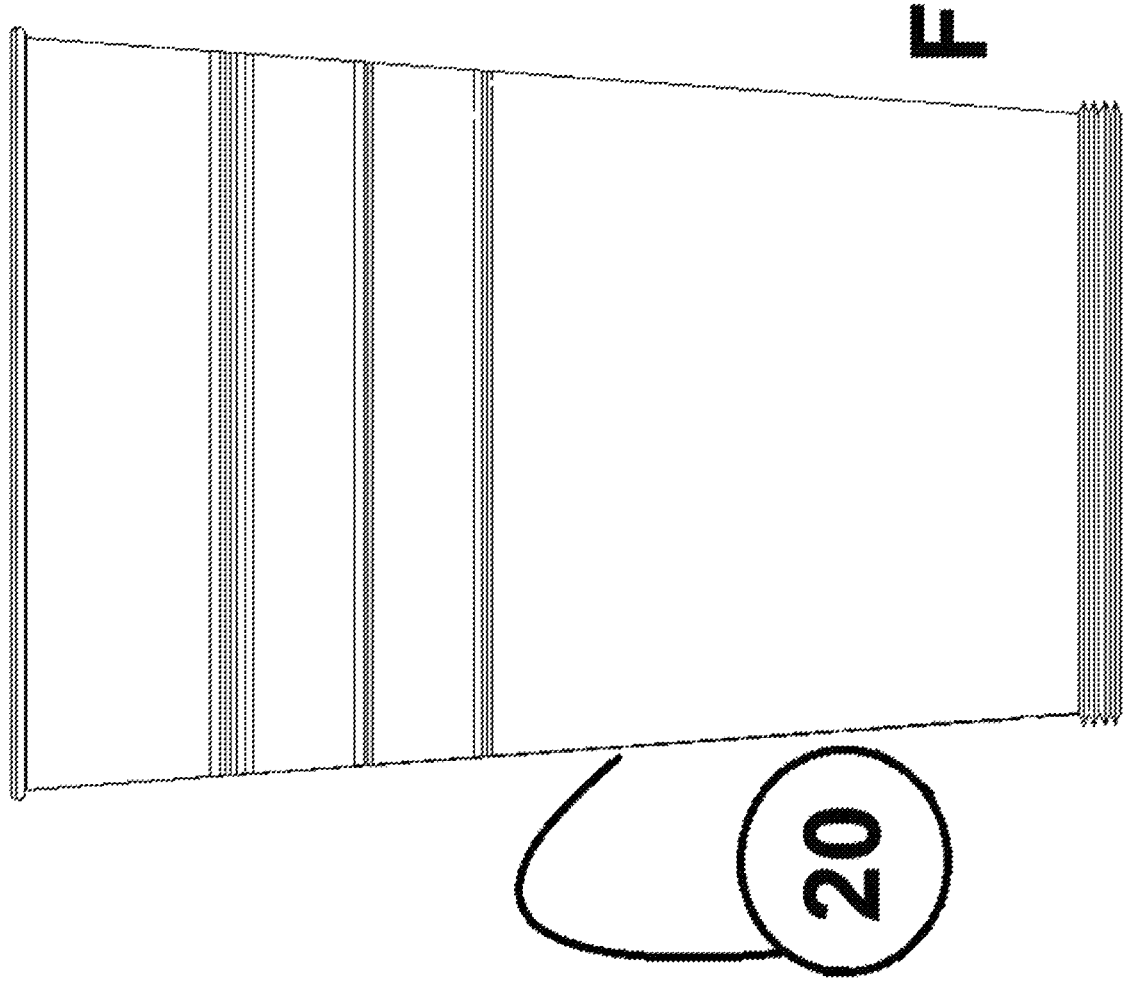

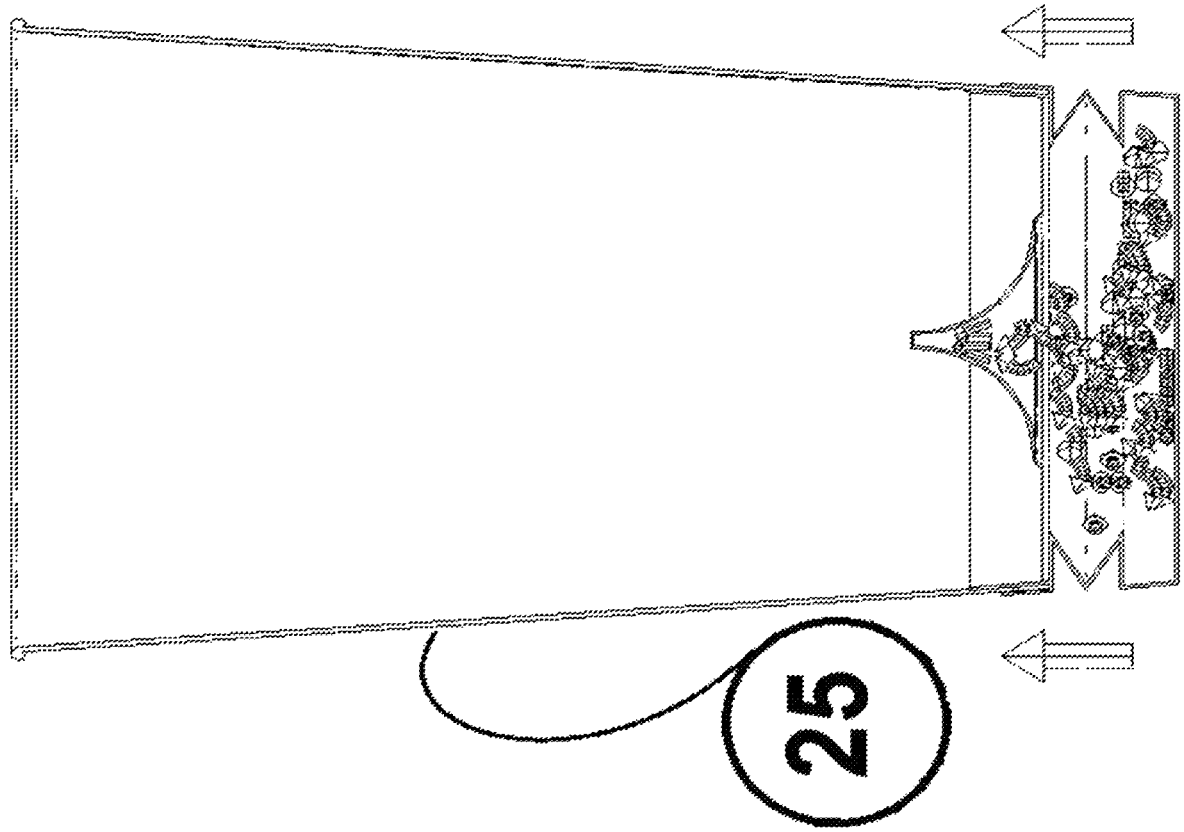

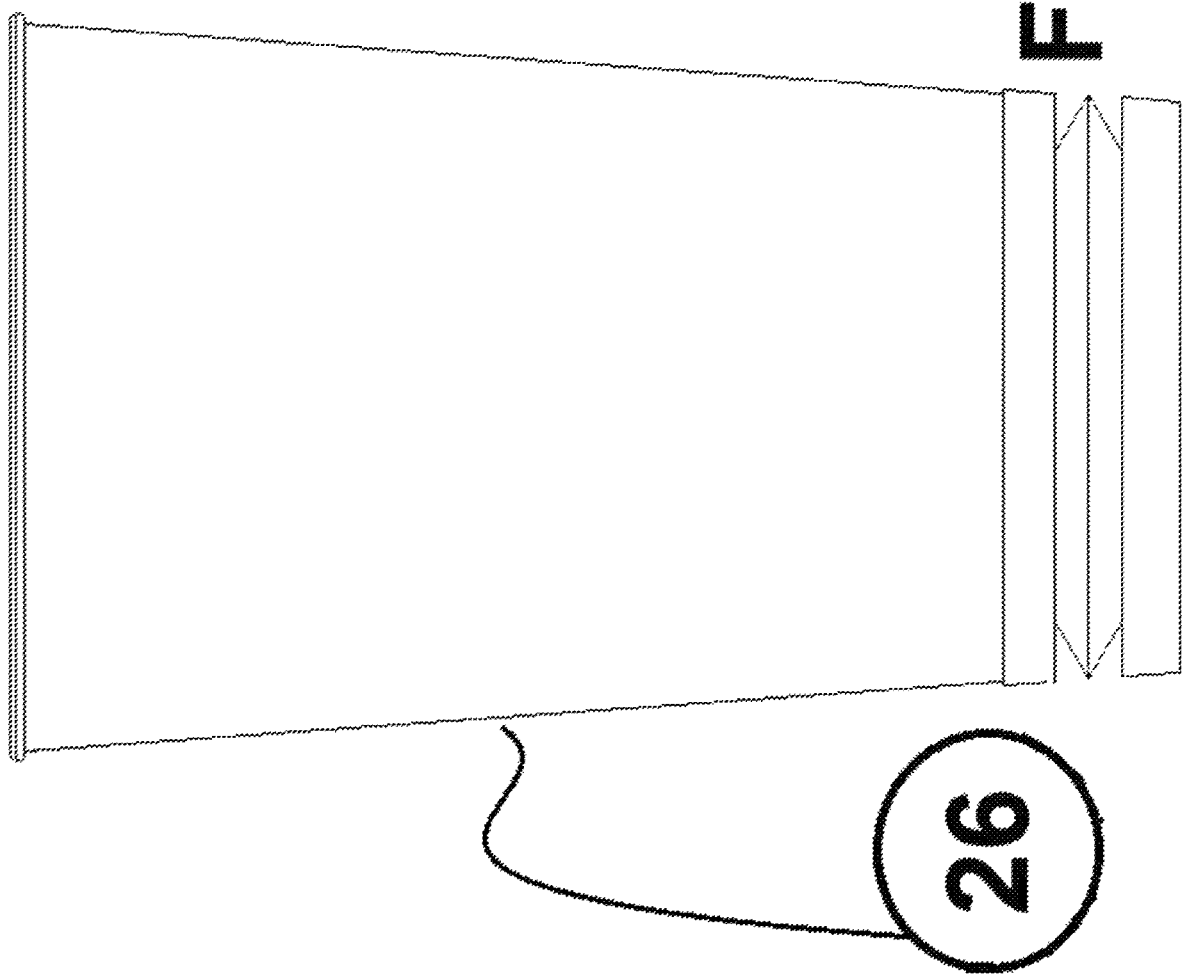

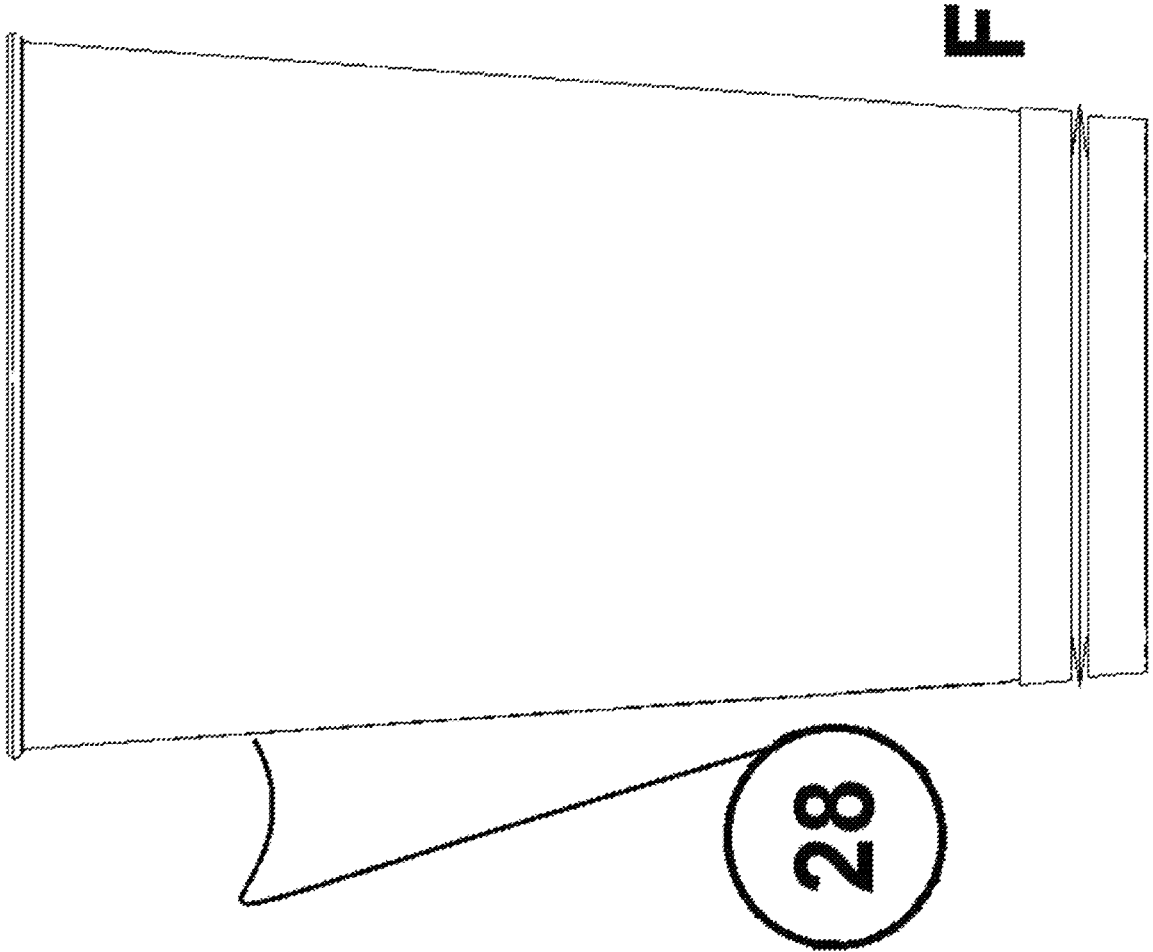

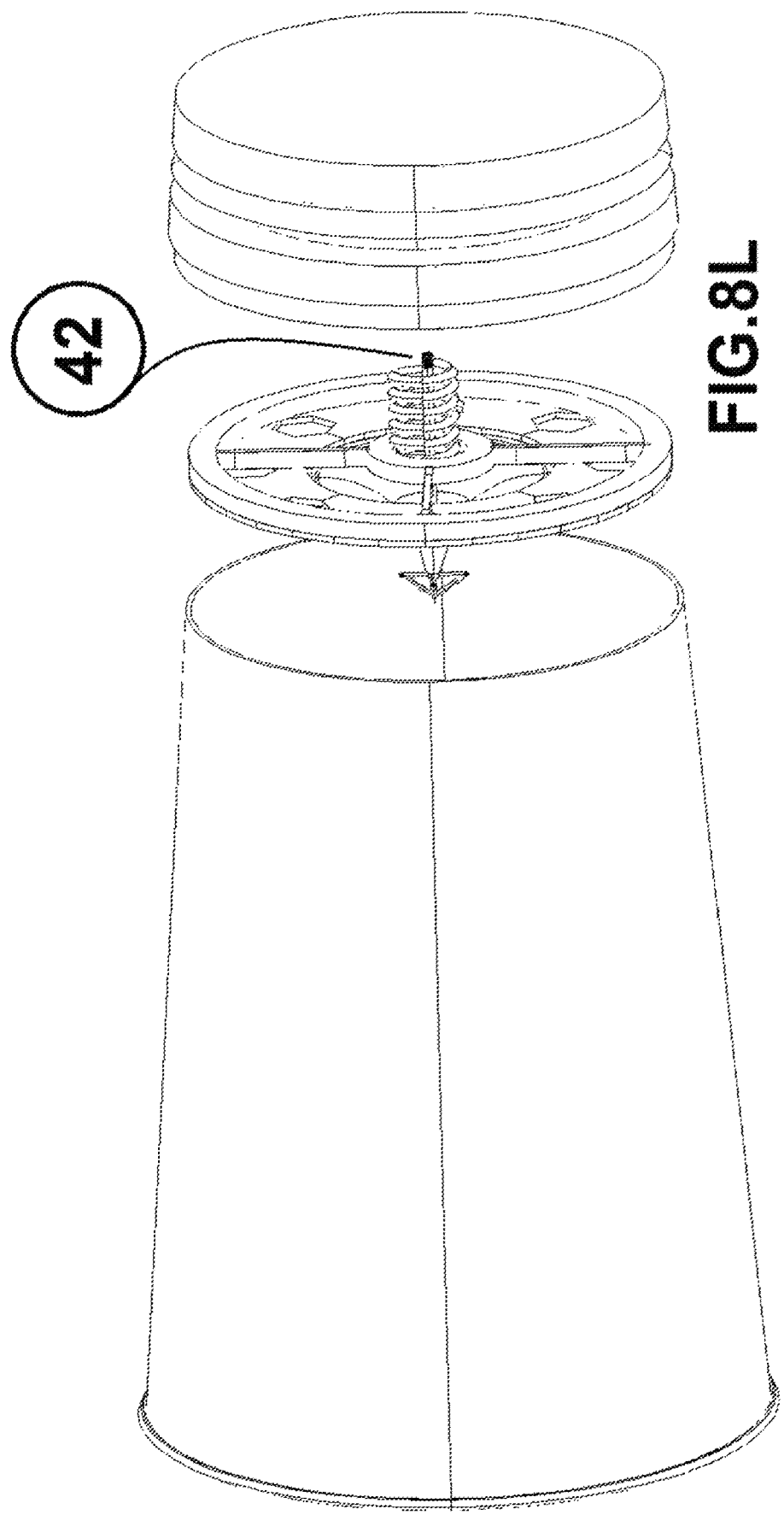

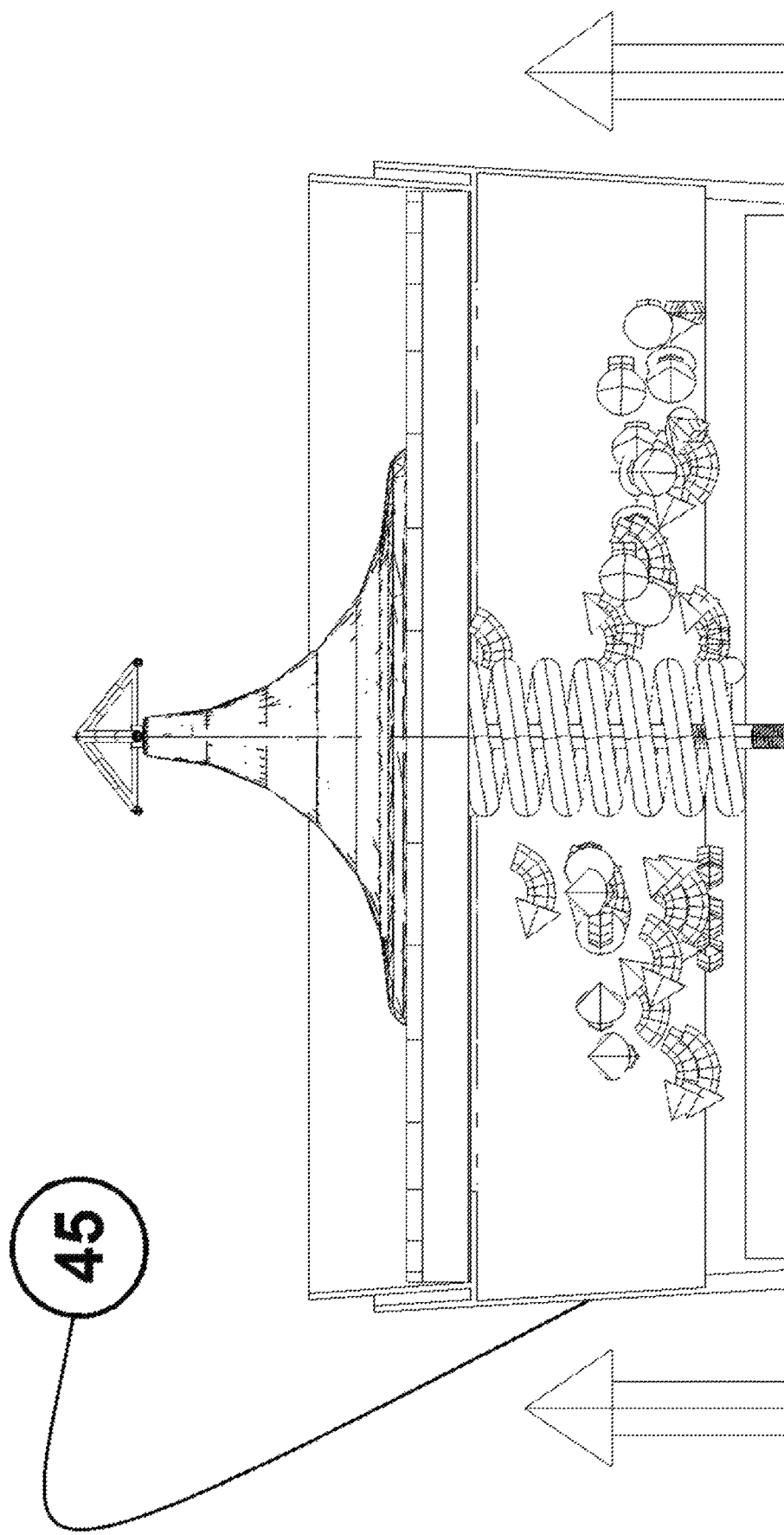

SINGLE DOUBLE LEVEL SWIVEL PLATFORM PLATES NOZZLE AND PRESSURIZED CONVOLUTION FORM METHOD TO PROCESS CONVERGENT STRESS ENERGY FLOW IN CYLINDRICAL CONTAINER UNIT

CROSS-REFERENCE TO RELATED APPLICATIONS

This application is a Non-Provisional Patent Application, filed Sep. 4, 2018, claiming the benefit of U.S. Provisional Patent Application Ser. No. 62/699,854, filed Jul. 18, 2018.

BACKGROUND OF THE INVENTION

Technical Field

This application generally relates to beverage containers with a mixing mechanism.

Related Art

In modern day society, we as humans desire to improve design around us. Most modern beverages primarily consist of a single liquid phase, such as wine, beer, milk, etc. However, other beverages may contain more than one liquid phase, such as mixed drinks, coffee with cream and sugar, etc. Adding multiple phases or flavor additives into a traditional beverage container often results in separation. In either case, the beverage should be mixed (e.g., stirred) at least occasionally for taste and enjoyment. This objective to mix is most evident after a multi-phase beverage is placed or poured into a container which causes separation and layers in beverages.

SUMMARY

The present invention produces convergent forced circulation that is designed to prevent liquid separation in the container.

An object is not to use any conventional loose single beverage related items such as spoons, straws, stir sticks to stir or mix the beverage. The new invention seeks to improve upon old conventional alternatives in choosing a better way to enjoy a beverage and other usage for the new invention.

The invention teaches pressurized vacuum lock suction on liquid stress that creates flow circulation in a container. The invention's solution of mixing or force cleaning through its platform plates and elastic methods are in the bottom portion unit. Some embodiments use stretchable fabrics such as rubber, silicone, metals, polymer material that work together the manual platform's level plate. The platform's level plate surface benefits from the functional energy liquid flow from these materials.

Some embodiments of the container operate by way of a vacuum lock suction. The platform plate can be in the configuration of a single level with constantly open release holes or a double level with closeable release holes. The release holes fluidly connect the compressible cavity with the vessel. The platform sits over a compressible cavity's convoluted shape walls.

Briefly described, the present invention provides a single or double level swivel platform plates, a nozzle and convolution walls in a compressible cavity body. This invention can be manually controlled by hand and used for multiple application purposes, such as keep liquid circulating for balance of taste, color, consistency of texture, force stress cleaning.

Accordingly, an object of this invention is to provide forced circulation that has the benefit of cleaning small parts, mixing beverage liquids of all types and consistencies, cleaning of small fruits and cut vegetables in a kitchenware accessories context, cleaning small instruments and items in an industrial liquid cleaning context, cleaning small bolts, screws and other items in liquid degreasers items in auto mechanic shop environments, mixing food ingredients for use in kitchenware accessories in making gravy sauce, and preventing or removing liquid or phase separation.

There and other objects, features and advantages of this invention will become apparent from the following detailed description.

BRIEF DESCRIPTION OF THE DRAWINGS

Referring now to the drawings, in which like numbers represent like elements, to show the various embodiments.

FIGS. 2A-2G. are a mix of perspective and side views of the compressible cavity body and platform.

FIGS. 4A-4B. is a view of liquid reservoir with lines or markings for notifying such as measure desired liquid level in the container opening based on a calculated volume of headspace needed to avoid spills created by mixing.

FIGS. 7A-7D. are distant cross-sectional and non-cross-sectional views of single or double level platform (platform detail not shown) container having accordion-like bellow convolutions in a compressed and uncompressed state.

FIGS. 8A-8M are various views of another embodiment. FIGS. 8N-8Q are various views of another embodiment with a floppy straight wall type of convolutions.

DETAILED DESCRIPTION OF THE INVENTION

Figure 1A:
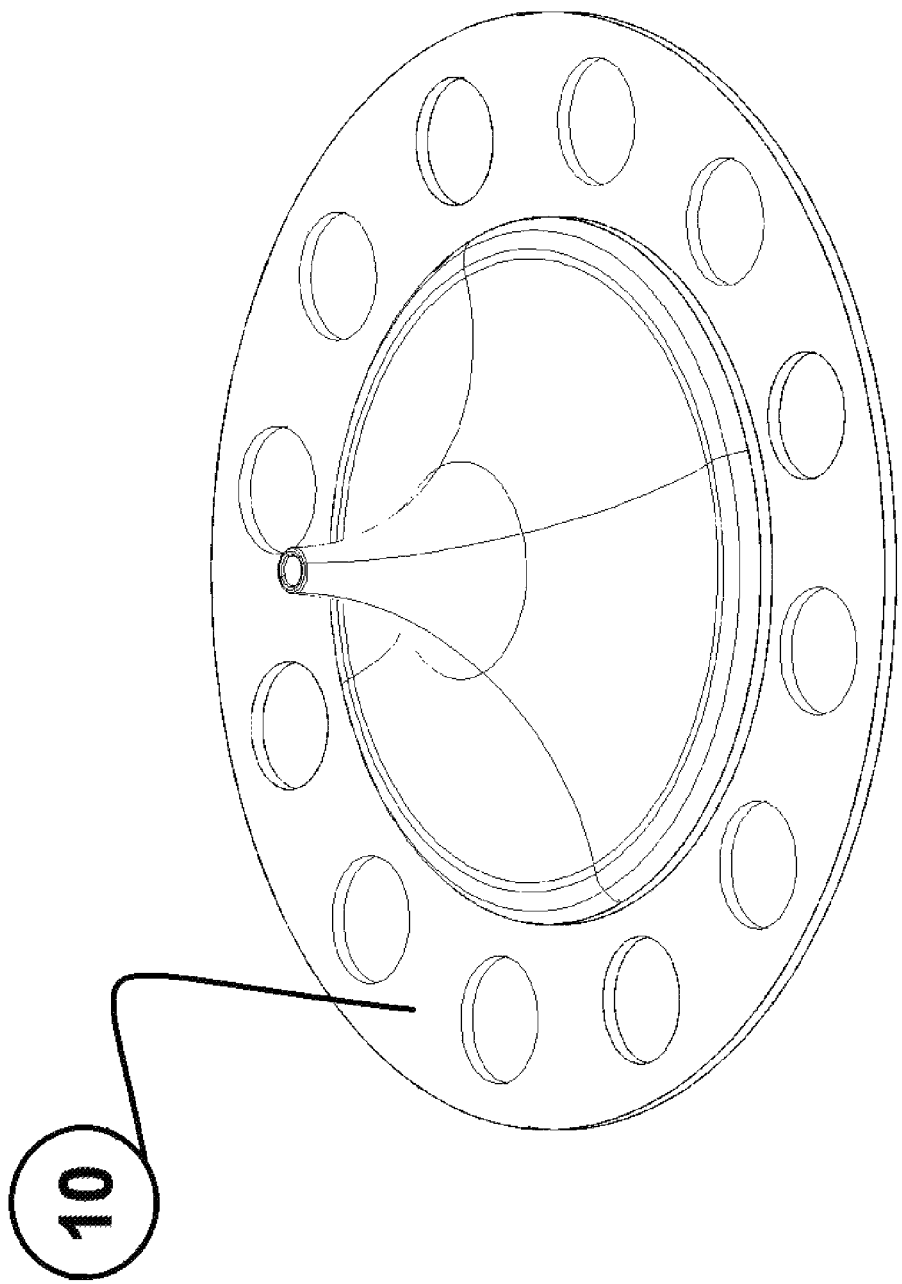
FIGS. 1A-1B. are respectively a perspective view and a cross sectional view of the platform and nozzle.

The present invention relates to the single- or double-level plate swivel platforms, a nozzle and a compressible cavity that forms convolutions it its walls and creates convergent flow upon the application of force and a top cylindrical container.

This new invention has two different unit mechanisms in its bottom compressible cavity. The first embodiment of the container has three key factors: the platform's surface level plates, the nozzle, and cylindrical convolution walls and cylindrical firm floppy straight wall units.

This second container embodiment has six key factors which is the main part called platform's surface level plates followed by the pin, nozzle, support crate, spring, cylindrical convolution walls and cylindrical firm floppy straight wall units.

The created features and innovative methods are for forced convergent flow circulating liquid fluids its container. Preferred configurations of a single & double level platform build in swivel axle and nozzle according to this invention are shown in the drawings of this application.

Figure 1B:
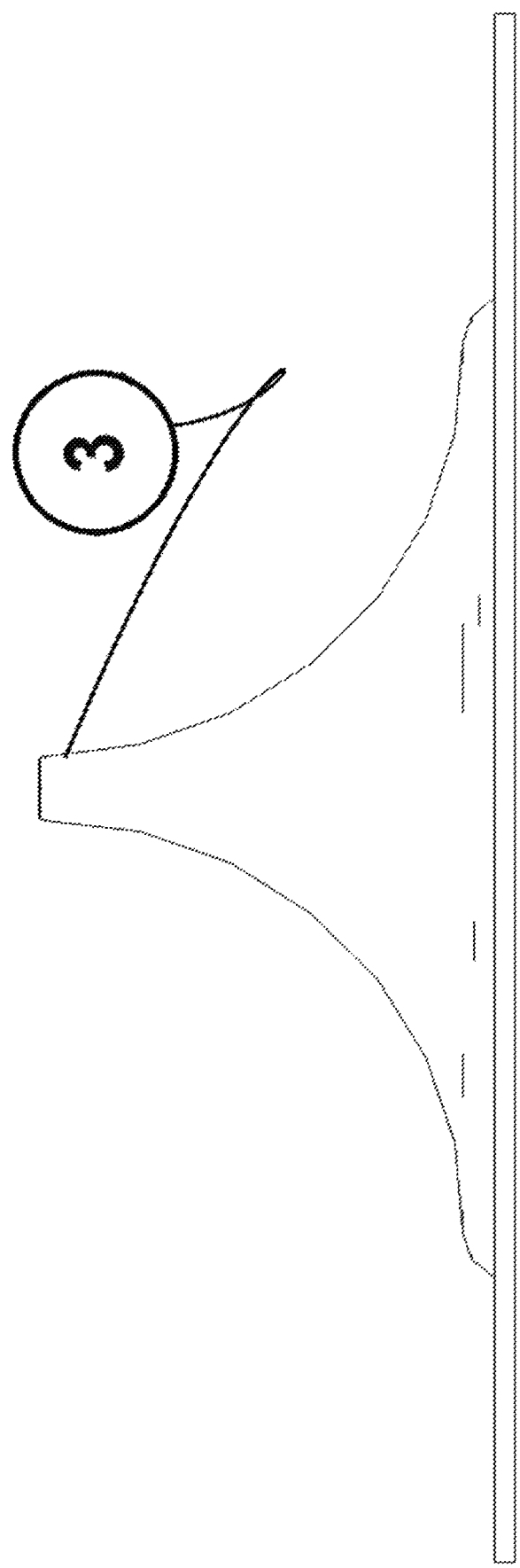

FIGS. 1A-1B shows an embodiment of this invention. FIG. 1A illustrates a single level platform 10. The single level platform 10 has release holes 7 designed to enable backflow through the release holes 7 by suction upon release of a compressive force on the compressible cavity body 1 and pressurized turbine flow 9 in its cavity upon a compressive force on the compressible cavity body 1. The opened wide release holes 7 freely access a much quicker vacuum back flow expansion. The convolution area 6 (referenced in later figures) in the walls of the compressible cavity body 1 returns back faster to its original shape within the compressible cavity. The platform 10 is designed to block force against its maximized platform surface to enhance flow through nozzle 3. The platform 10 releases a minimum flow from its platform release holes 7 to reduce or prevent a slow vacuum allowing back flow to the compressible cavity body 1. FIG. 1B shows a nozzle 3 that accelerates convergent flow from the compressible cavity body 1 into the cylinder.

Figure 2A:
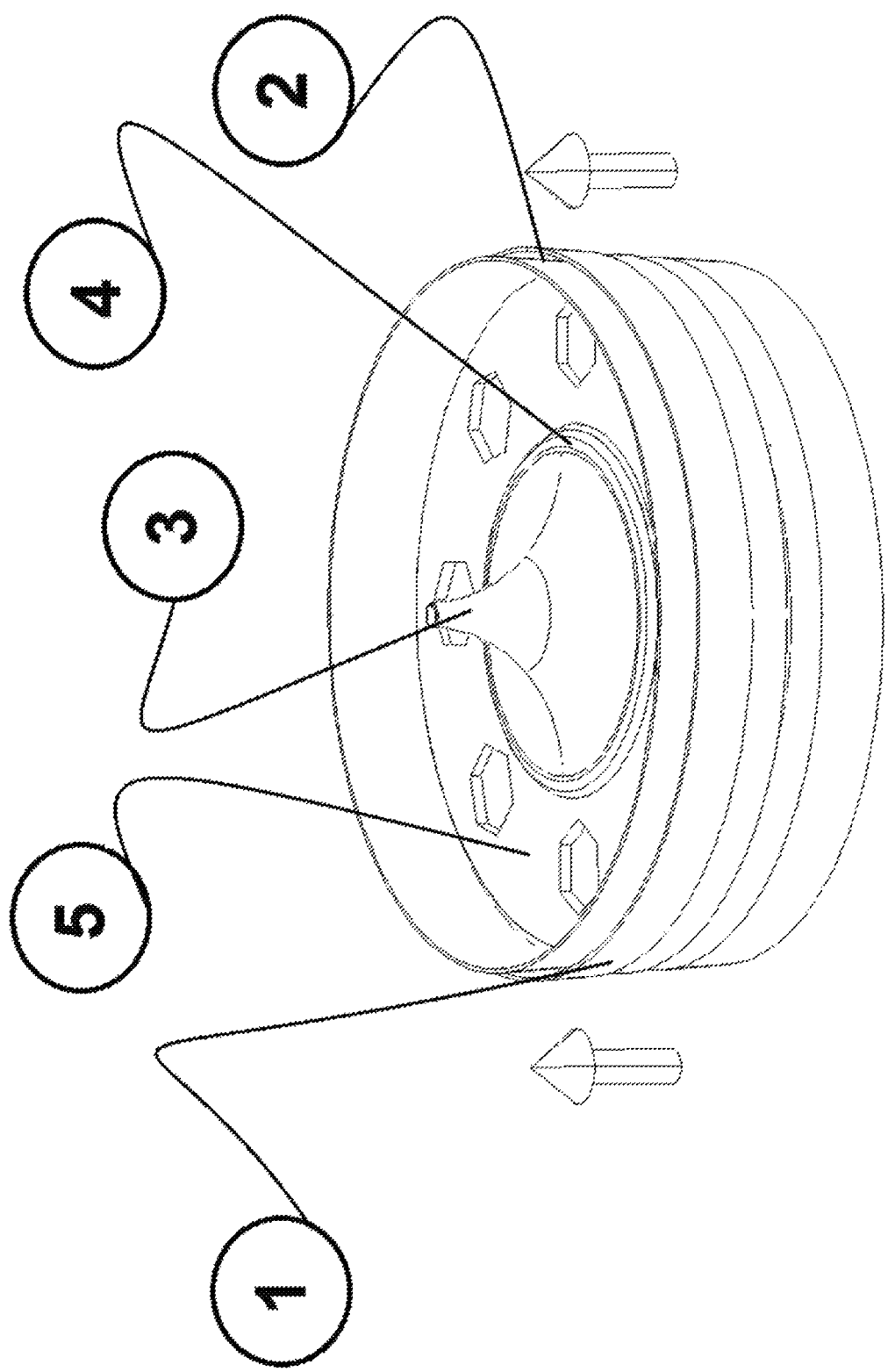
Figure 2B:
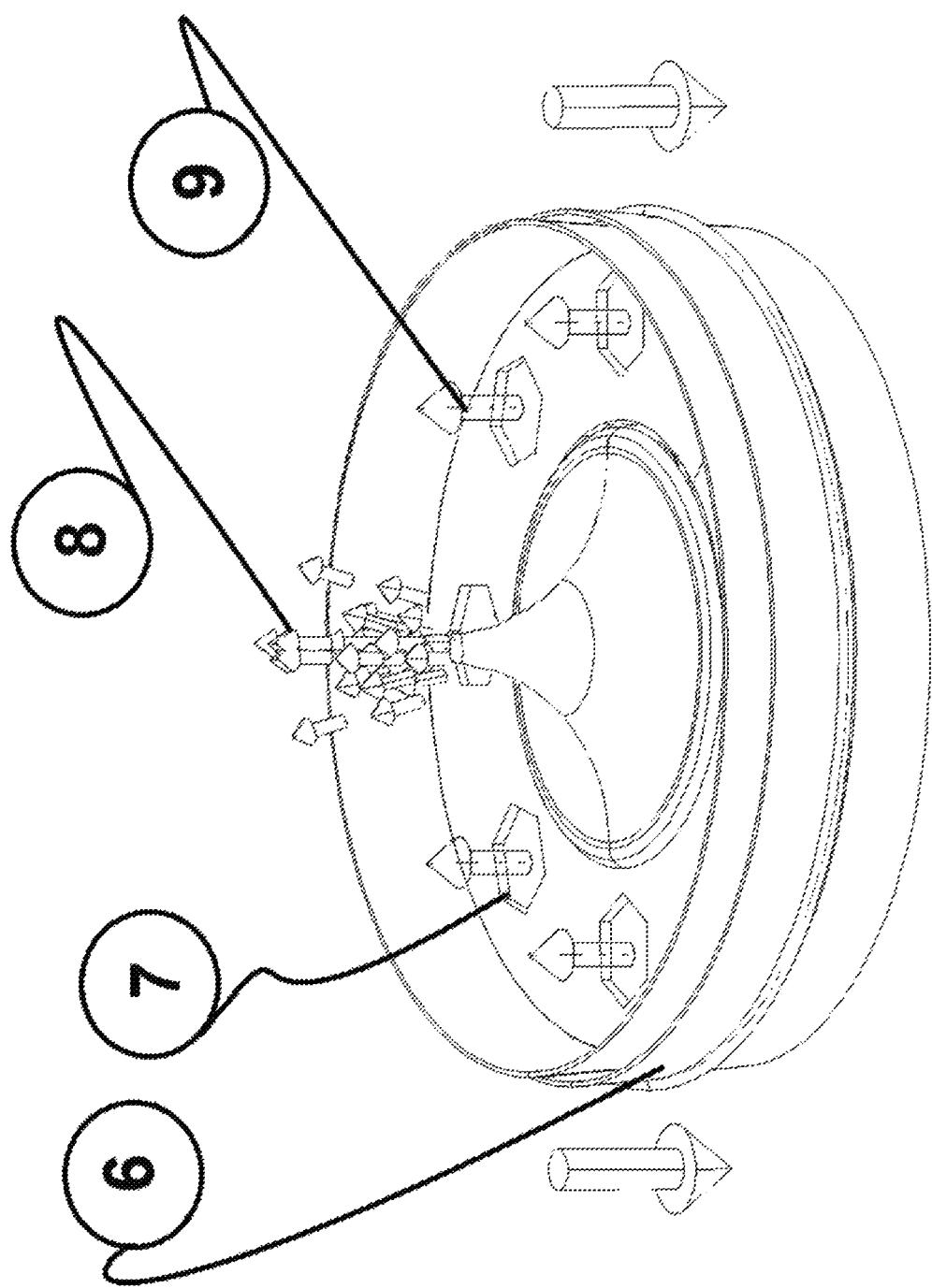
Figure 2C:
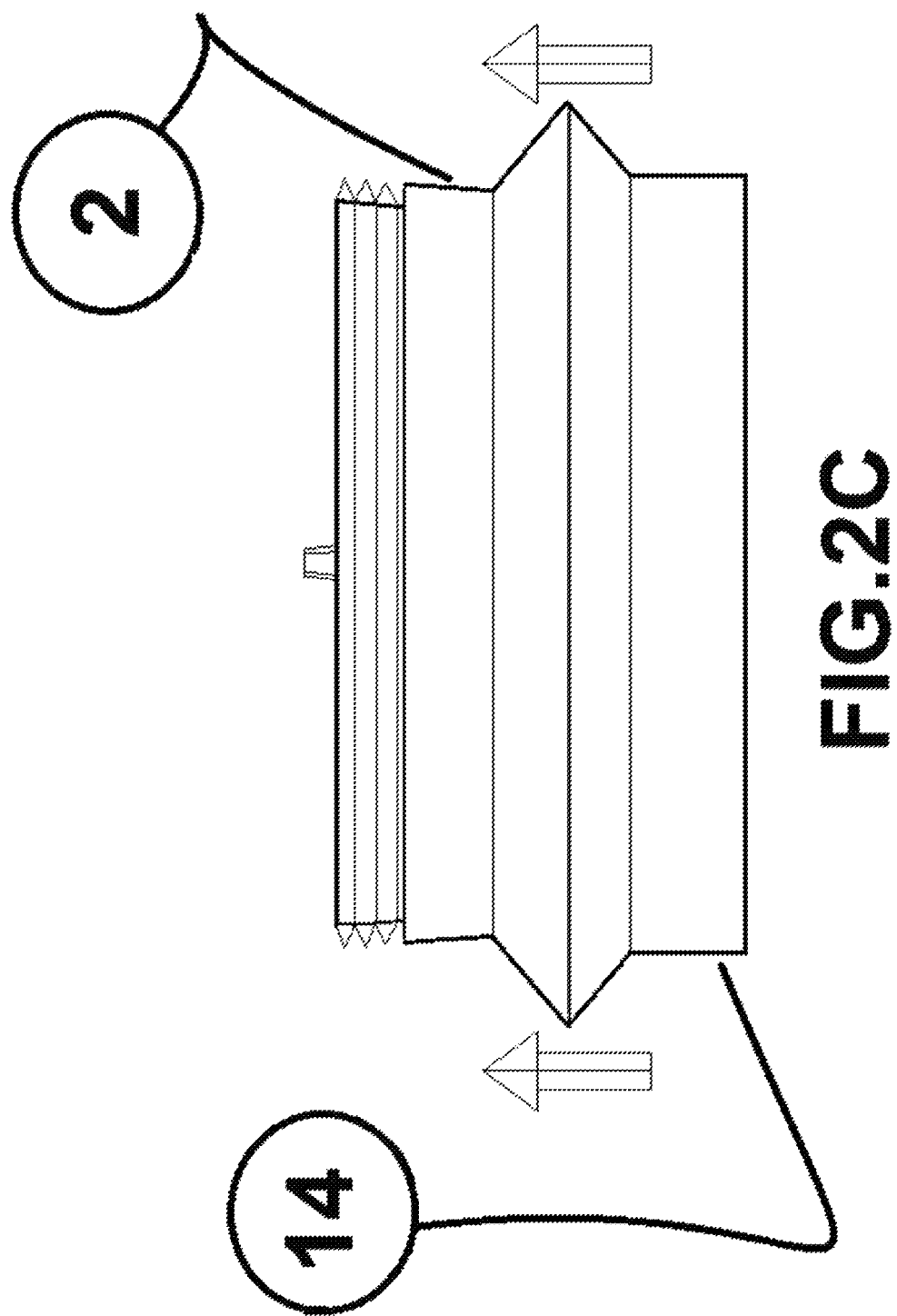
Figure 2E:
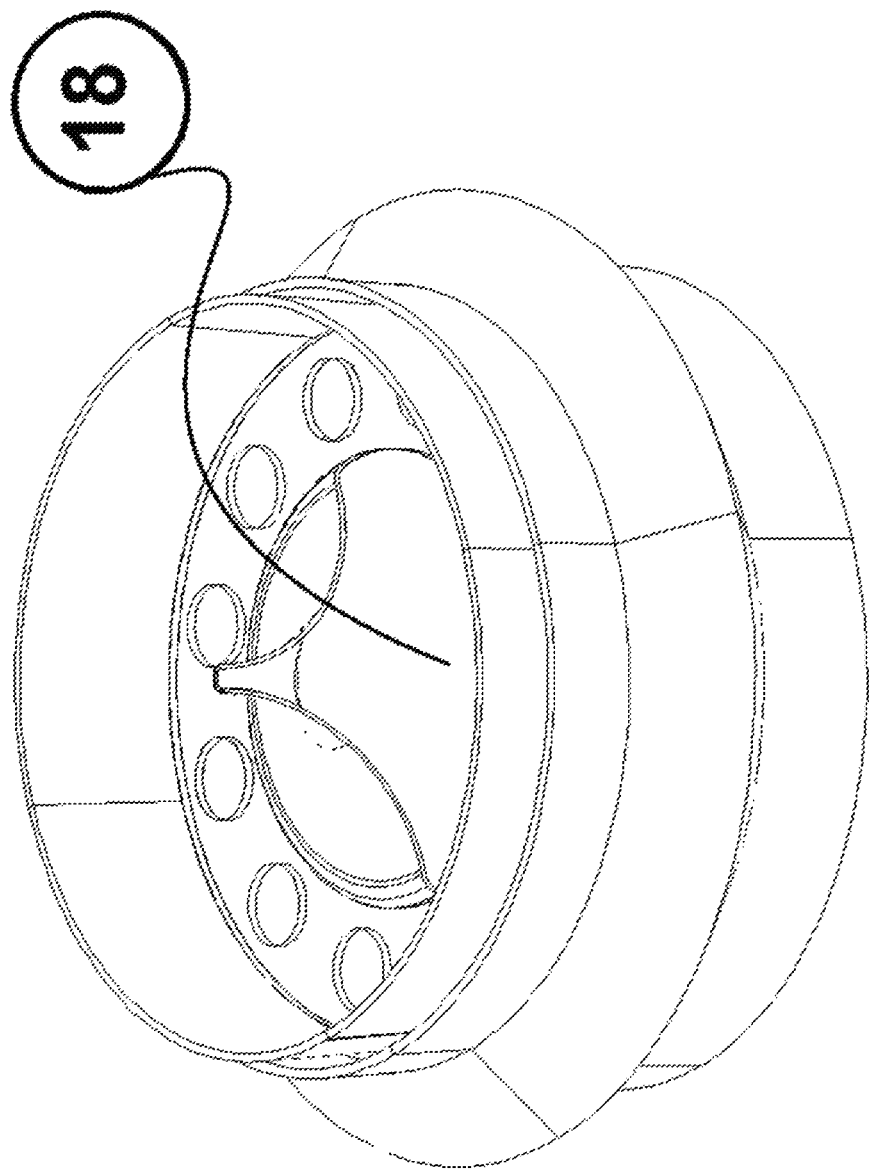
Figure 2F:
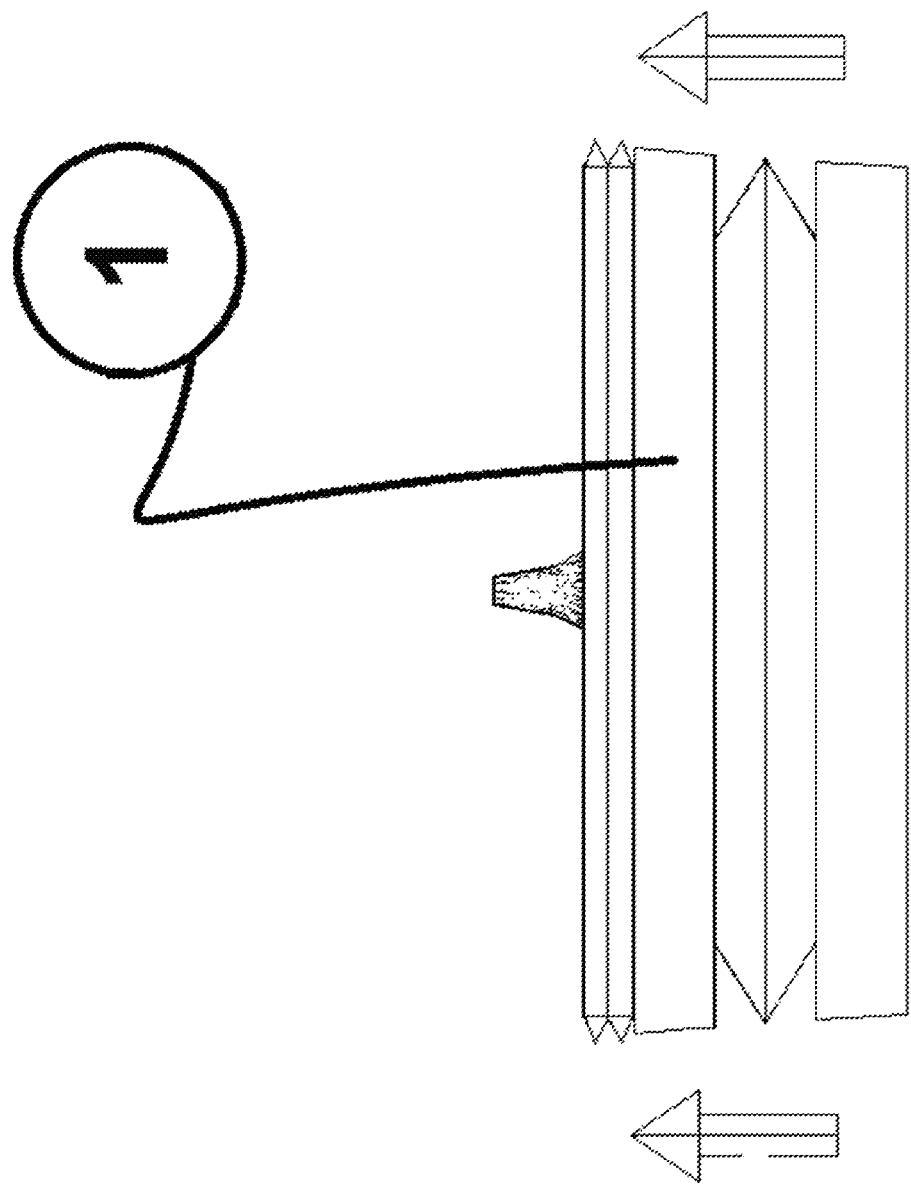

FIGS. 2A-2G shows an embodiment of this invention. FIG. 2A shows compressible cavity body 1 with single level platform plate 5 and nozzle 3. Top threaded rim base 2 is set above the compressible cavity body's 1 convolution area 6 and is where the cylinder or vessel can be attached to the compressible cavity body. Nozzle 3 is attachable or detachable to attachment point 4 to the single Platform 5. FIG. 2B illustrates convolution area 6 while the compressible cavity body is being compressed. The Platform 5 has release holes 7 to reduce or prevent a slow vacuum in the compressible cavity body 1 allowing back flow to the compressible cavity body. Convergent flow 8 is forced through the nozzle 3 and a controlled release divergent flow 9 moves through the release holes 7. FIG. 2C shows the top threaded rim base 2 set above convolution area 6 and the bottom base area 14. FIG. 2D illustrates convolution of the convolution area 6 caused by the compressible cavity body 1 in a compressed state (stress mode). This compression causes the liquid in the compressible cavity body 1 to be under intense hydraulic pressure, which is released through the pathway through the nozzle 3 in a forced convergent turbine flow 8. FIG. 2E shows a cut-away sectional view 18 of the nozzle 3 in the context of a perspective view of the platform and the compressible cavity body 1. FIG. 2F shows the compressible cavity body 1 after the compression state is released where the convolutions are being reduced. FIG. 2G depicts a compressed cavity body 15 indicating an act of compression by way of physical hand pressure that creates an accelerated convergent turbine flow through its nozzle 3.

Figure 3A:
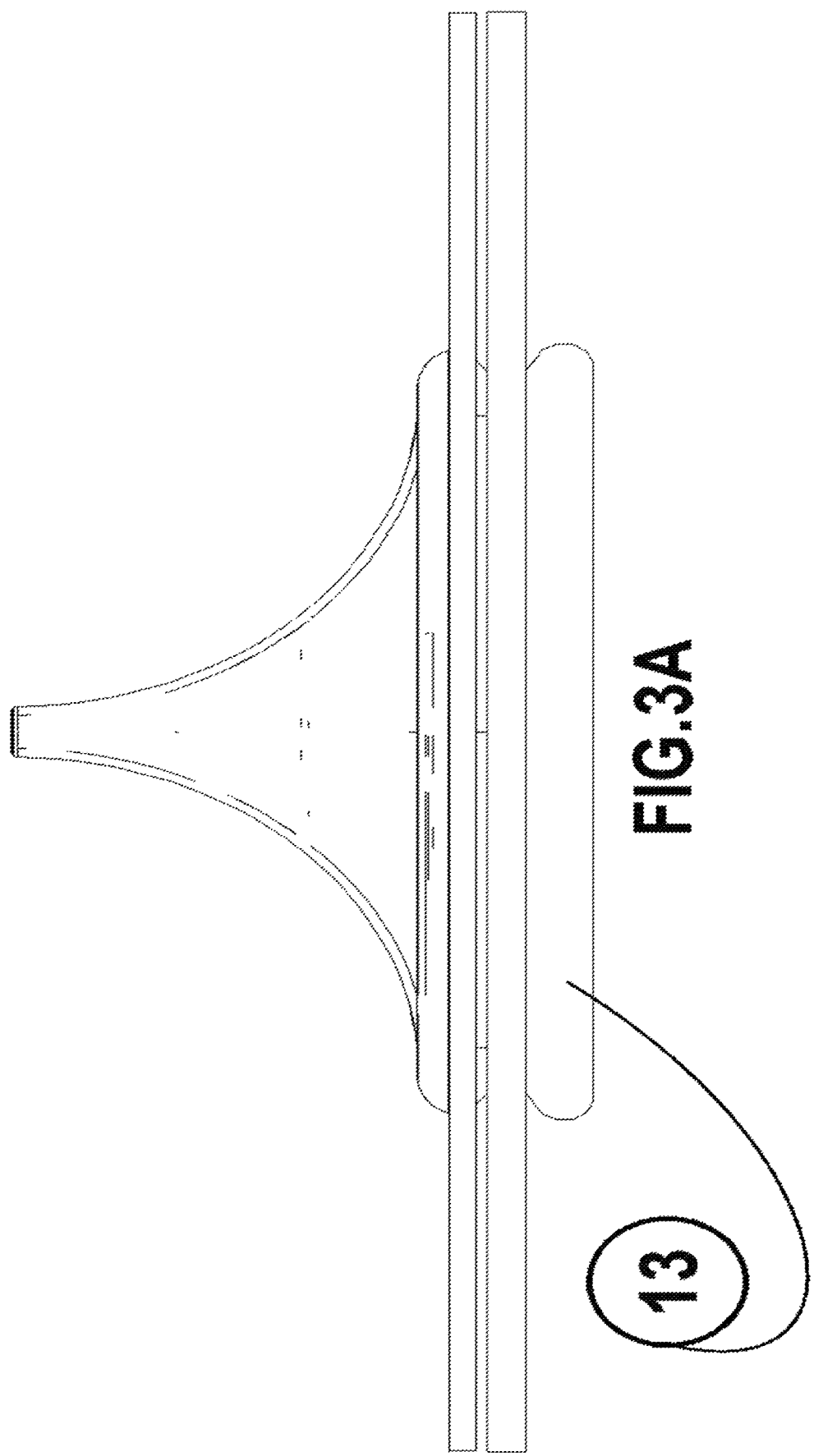
FIGS. 3A-3D. are respectively side, perspective, bottom and exploded views of an embodiment with a double-level platform, swivel axle and nozzle.
Figure 3B:
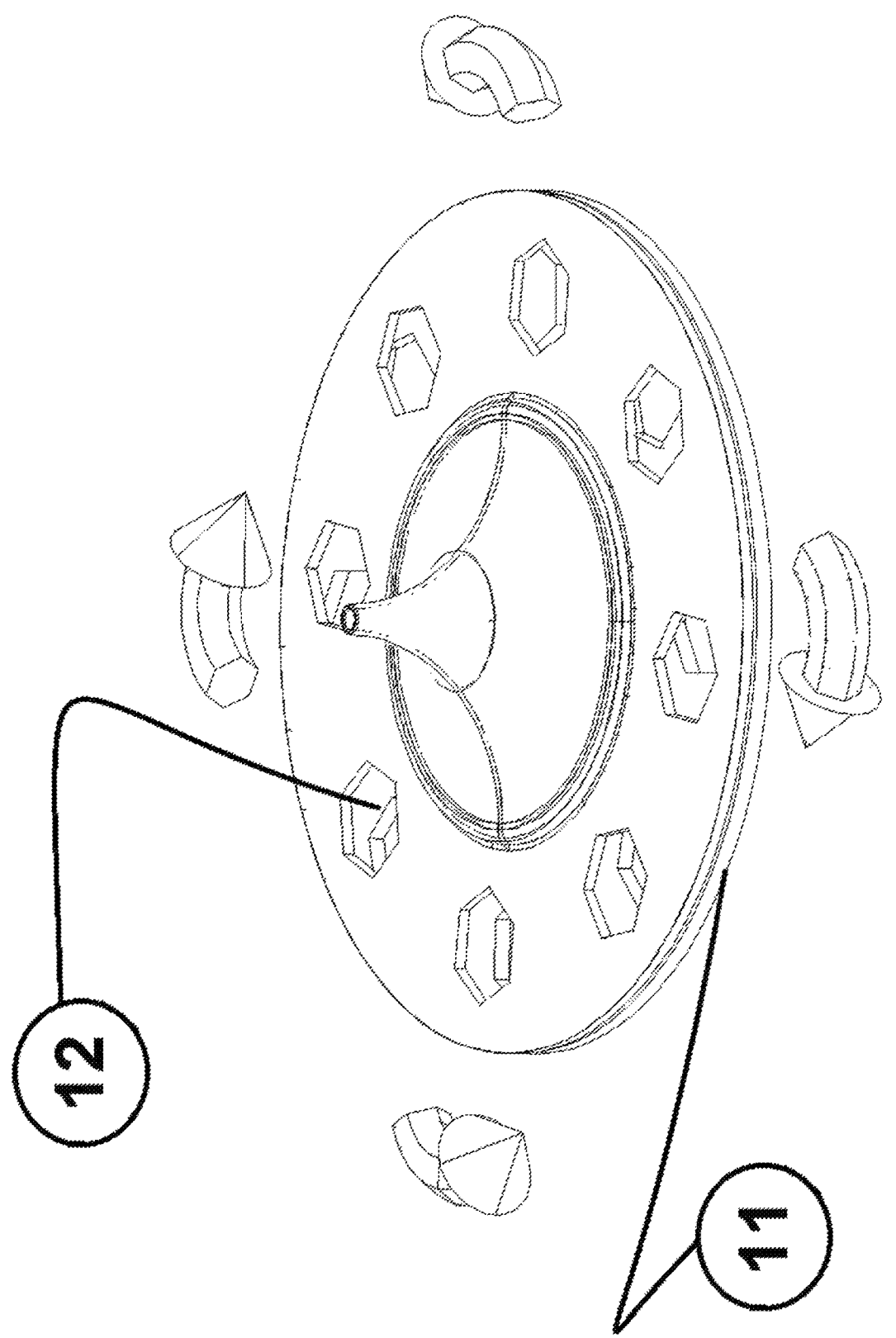
Figure 3C:
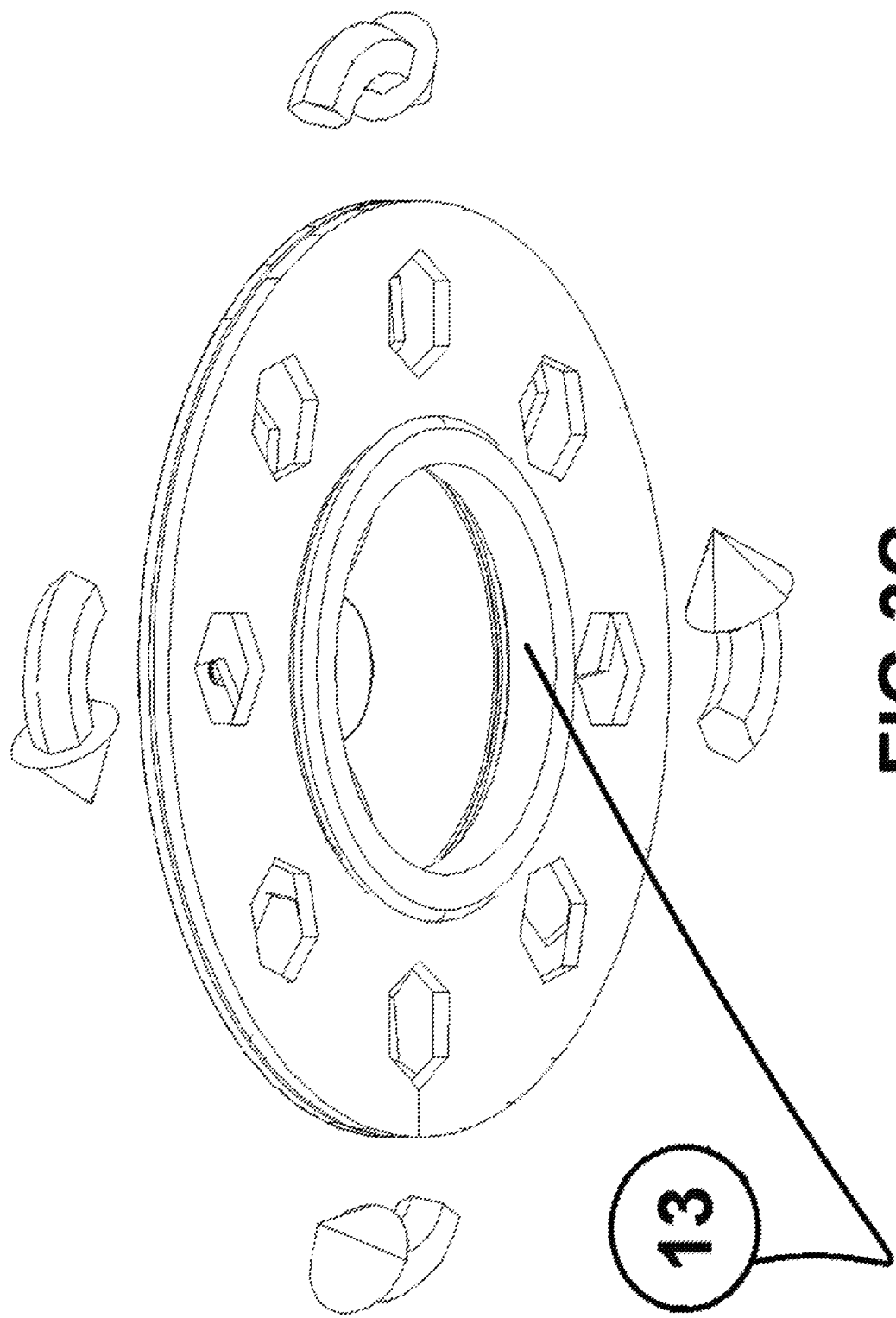
Figure 3D:
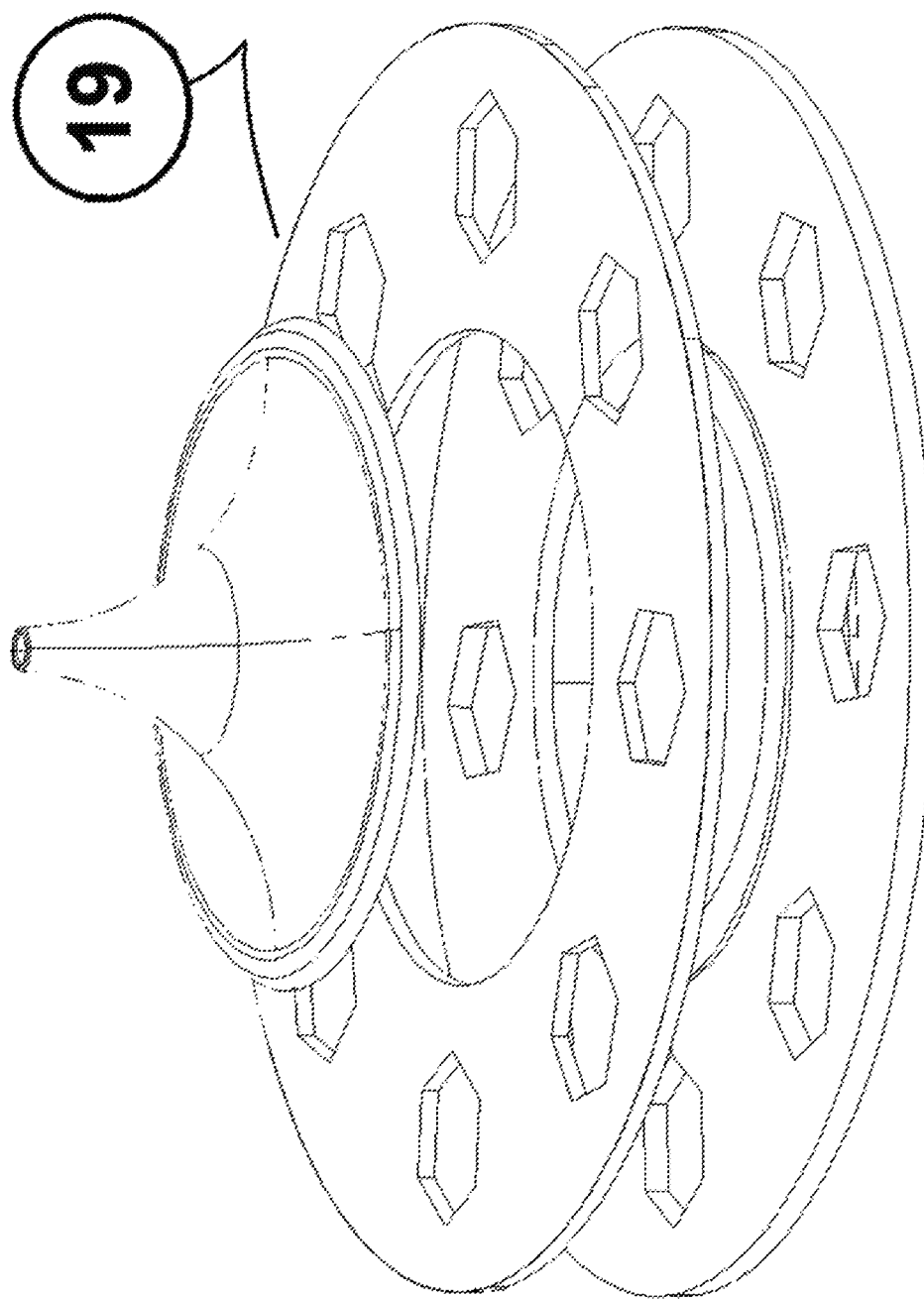

FIGS. 3A-3D shows an embodiment of this invention. FIG. 3A indicates a double-level platform 11 and a swivel axle 13. The two-level platform is attached by way of swivel axle 13, which here is shown as a clamp inserted in the center of the platform, sandwiching the upper-level plate and the lower-level plate together and allowing the plates to rotate relative to each other. The design purpose of the rotation is to enable a desired opening control divergent turbine flow to be dialed in through the desired position of the double level platform 11. FIG. 3B illustrates the effect of this rotation on the release holes 7 on the double level platform 11. From the perspective view, an area 12 of the lower-level plate is visible through the release holes 7 of the upper-level platform plate. Because the release holes in this Figure have an identical size and layout across the two plates, this area 12 demonstrates that the lower plate's release holes are partially blocked due to the rotation allowing less release hole flow 9. The swivel axle holds the platform plates close together. If the holes are wide open on the double level platform 11 they will cause less hydraulic stress on the liquid forcing convergent flow 8 through the nozzle at a lower rate. The platform's manual position can be controlled by hand to adjust circulation of outward flow separate from the convergent flow 8 through the nozzle 3, a divergent flow 9 through the platform's release holes 7. Conversely, if the release holes 7 are fully obstructed, the hydraulic pressure on the liquid in the compressible cavity body 1 will be greater causing a stronger convergent flow 8 through the nozzle 3. After compression is released, the compressible cavity body 1 will form a vacuum causing back flow. The convoluted walls will reflect back to their original shape much slower in the compressible cavity body when the release holes are obstructed. Other than the allowed flow through the release holes, the platform's surface is designed to block pressure leakage to facilitate a powerful stress flow through its nozzle. If desired, at least a minimum flow from its platform release holes 7 can be dialed in to reduce or prevent a slow vacuum back flow to the compressible cavity body 1. FIG. 3C shows a double level platform 11 held sandwiched together by the swivel axle 13. At least one of the platform plates can be rotated for a desired opening control divergent turbine flow 9. FIG. 3D shows an exploded view 19 of the swivel axle and double level platform 11 and nozzle.

FIGS. 4A-4B shows an embodiment of hollow cylinder container 20 that acts as a liquid reservoir. FIG. 4A depicts a level indicator 16 of tolerated liquid volume for preventing spill out of the top of the hollow cylinder container 20. Hollow cylinder container 20 has a threaded bottom end 17 to connect to the top base area 2 on the compressible cavity body 1. FIG. 4B illustrates a standard geometric shape such as a cylindrical container measure the radius of the container opening (r) and calculate volume of displaced liquid using this formula=TTr (2) (change water depth).

Figure 5A:
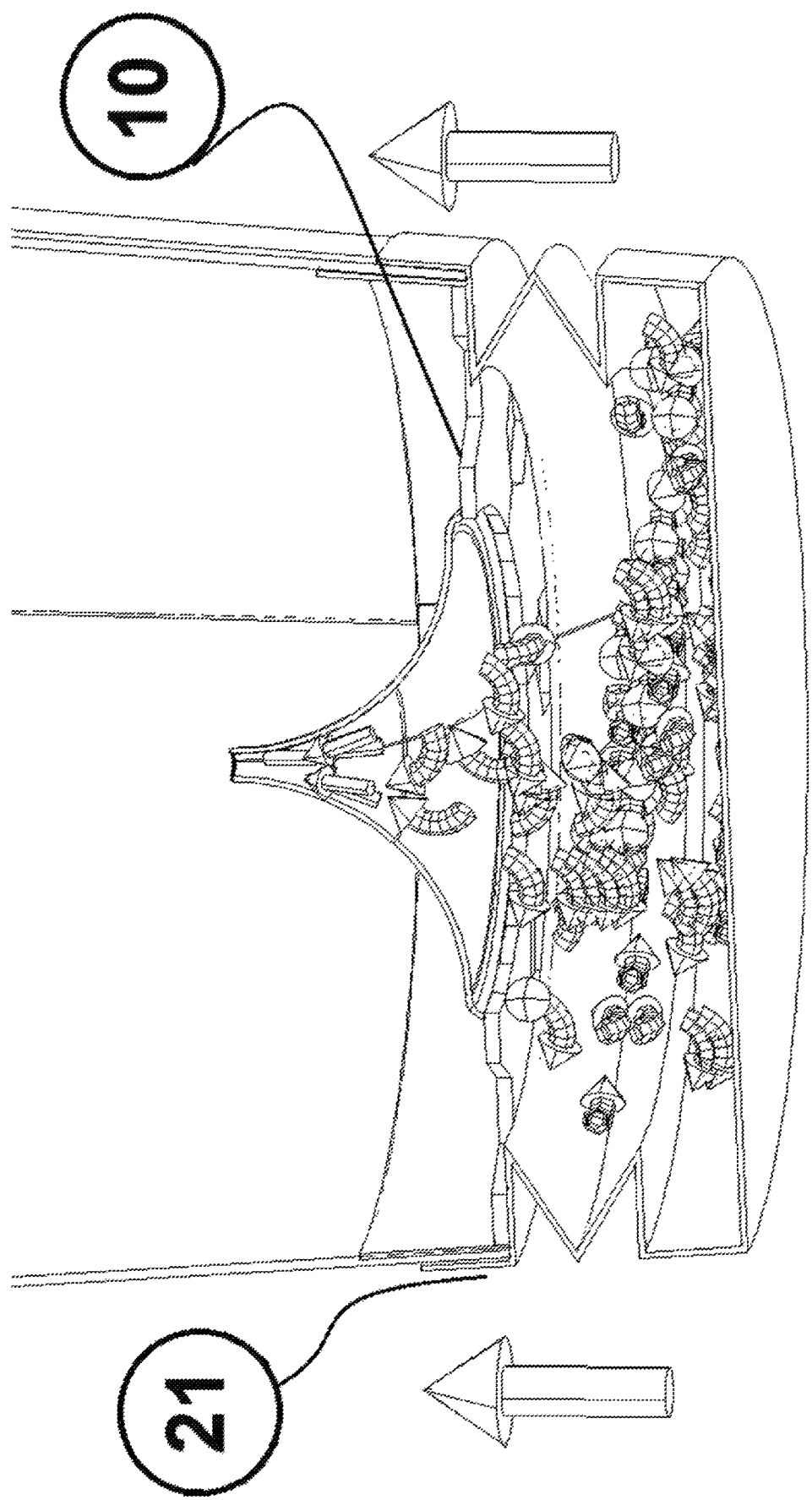
FIGS. 5A-5B. is a close-up cross-sectional view of a single level platform container having accordion-like bellow convolutions in a compressed and uncompressed state.
Figure 5B:
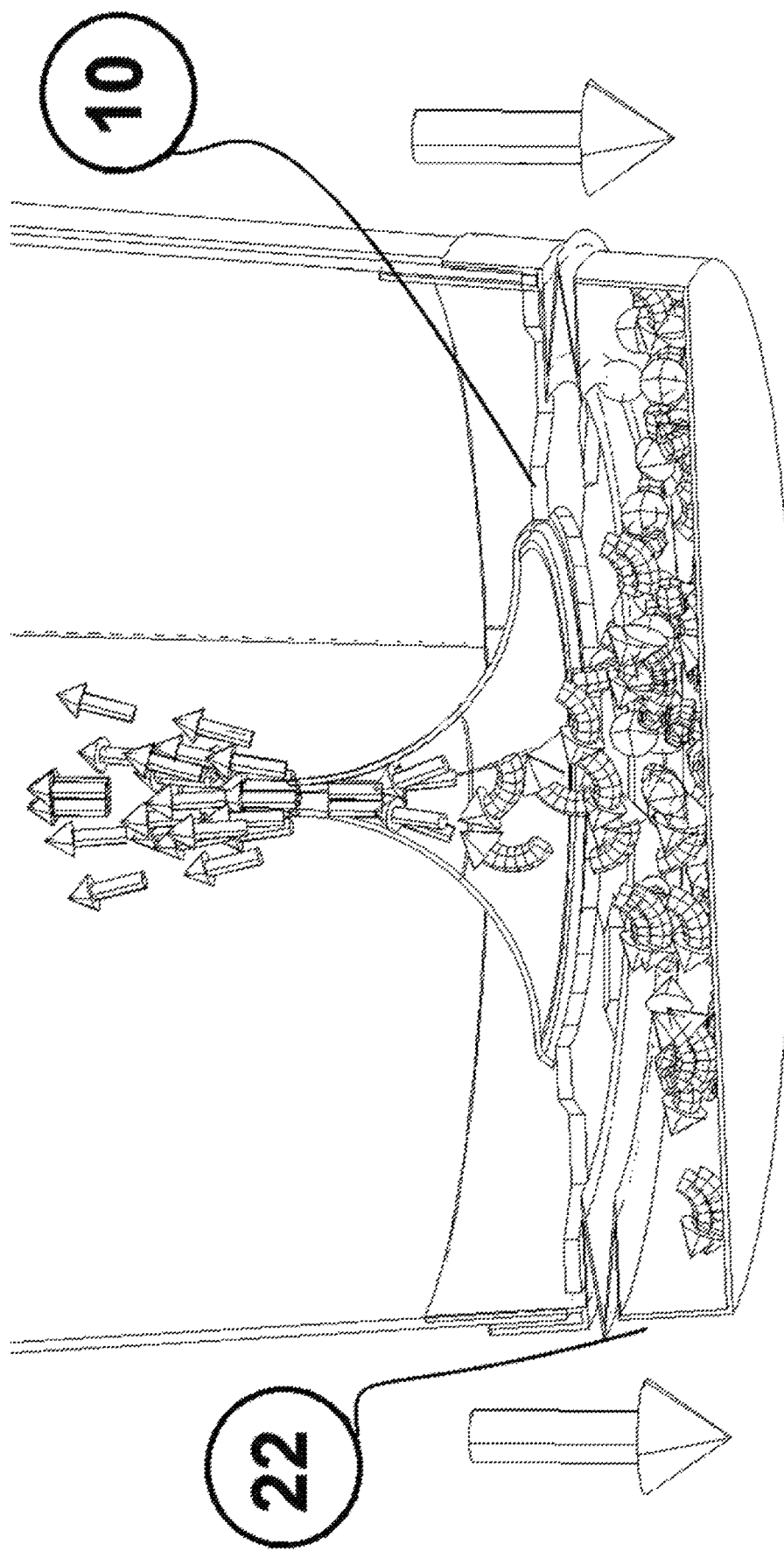

FIGS. 5A-5B shows cross-sectional views of another embodiment of this invention. FIG. 5A illustrates a compressible cavity body 1, single level platform 10 and a liquid reservoir in an uncompressed state. The single level platform 10 with its release holes 7 is designed to vacuum back flow much easier and quicker pressurized turbine flow 9 in its cavity. The opened wide release holes 7 allow the compressible cavity body 1 freely access a much quicker vacuum back flow upon expansion on its convoluted walls upon release of the compression. The convolution area 6 returns back faster to its original shape within the compressible cavity body 1 as a result of the open release holes 7. FIG. 5A depicts the convolution area as uncompressed accordion-like bellows 21. FIG. 5B illustrates the same embodiment under compression. FIG. 5B depicts compressed accordion-like bellows 22.

Figure 6A:
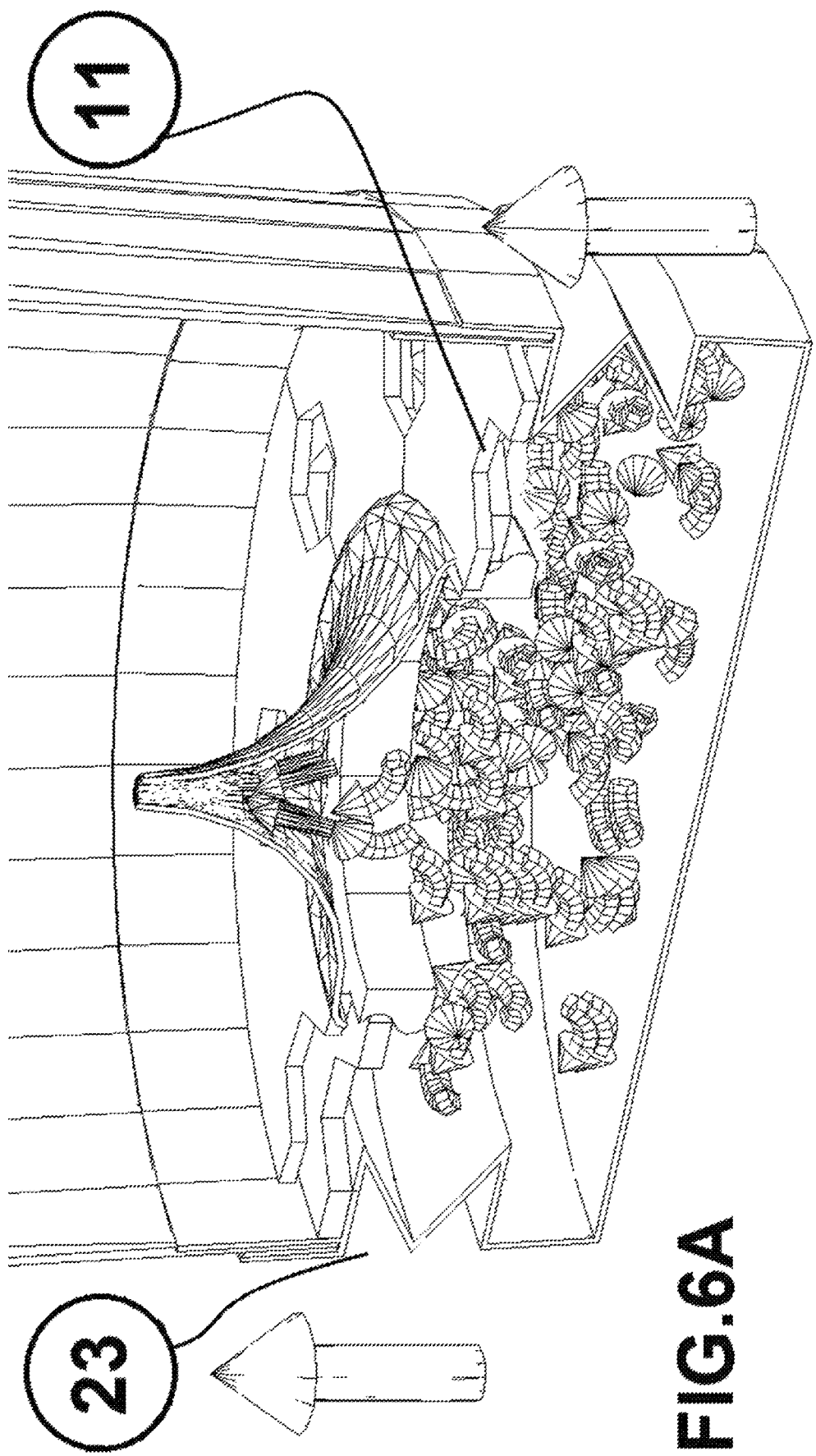
FIGS. 6A-6B. is a close-up cross-sectional view of a double level platform container having accordion-like bellow convolutions in a compressed and uncompressed state.
Figure 6B:
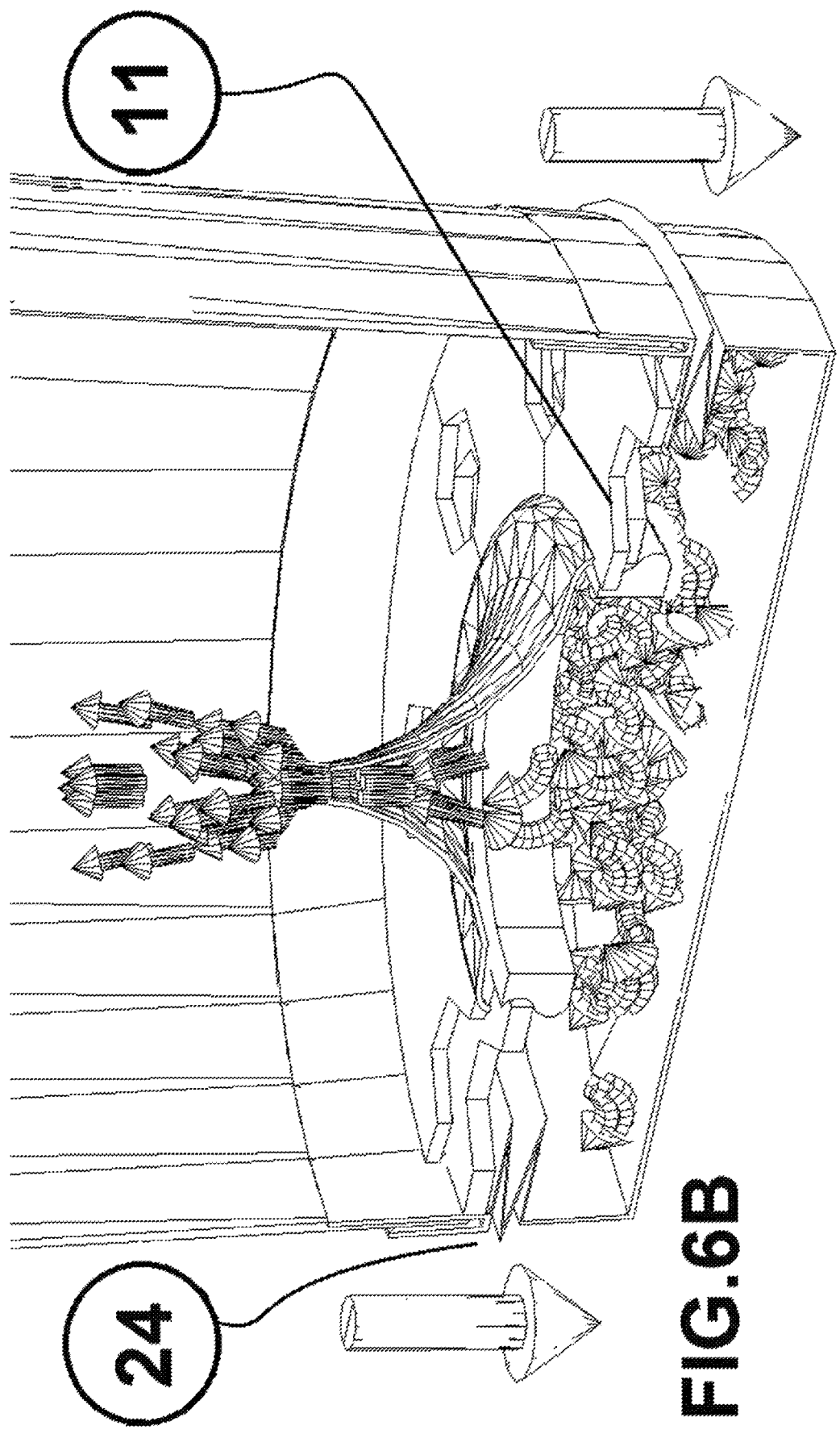

FIGS. 6A-6B shows cross-sectional views of a similar embodiment to that shown in FIGS. 5A-5B except that the single level platform 10 is replaced with double level platform 11.

Figure 7C:
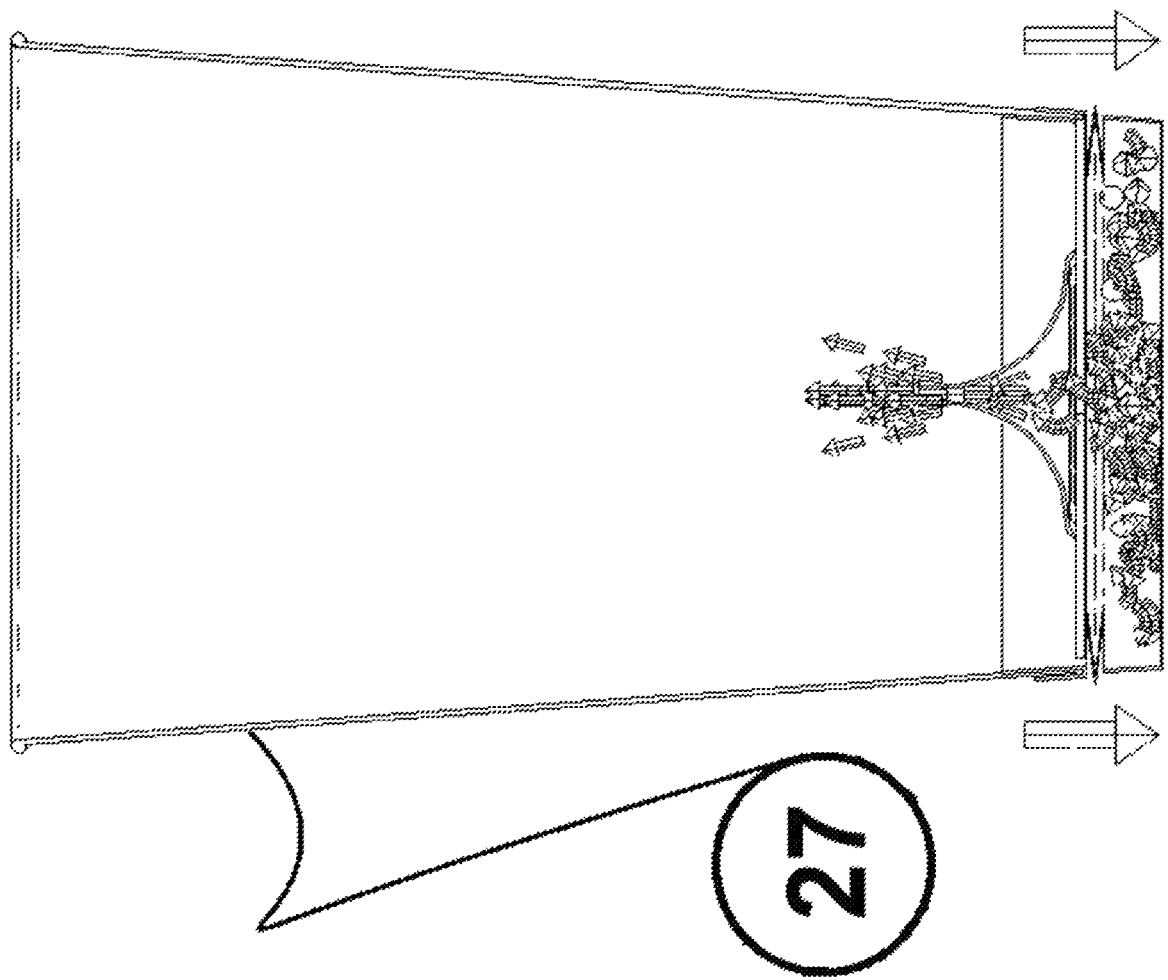

FIGS. 7A-7D. are distant cross-sectional and non-cross-sectional views of single or double level platform (platform detail not shown) containers having accordion-like bellow convolutions in a compressed and uncompressed state. FIG. 7A shows a cross-section 25 of the container uncompressed. FIG. 7B illustrates a whole complete finish view 26 of the container uncompressed. FIG. 7C shows a cross-section 27 of the container under compression. FIG. 7D illustrates a whole complete finish view 28 of the container under compression.

Figure 8A:
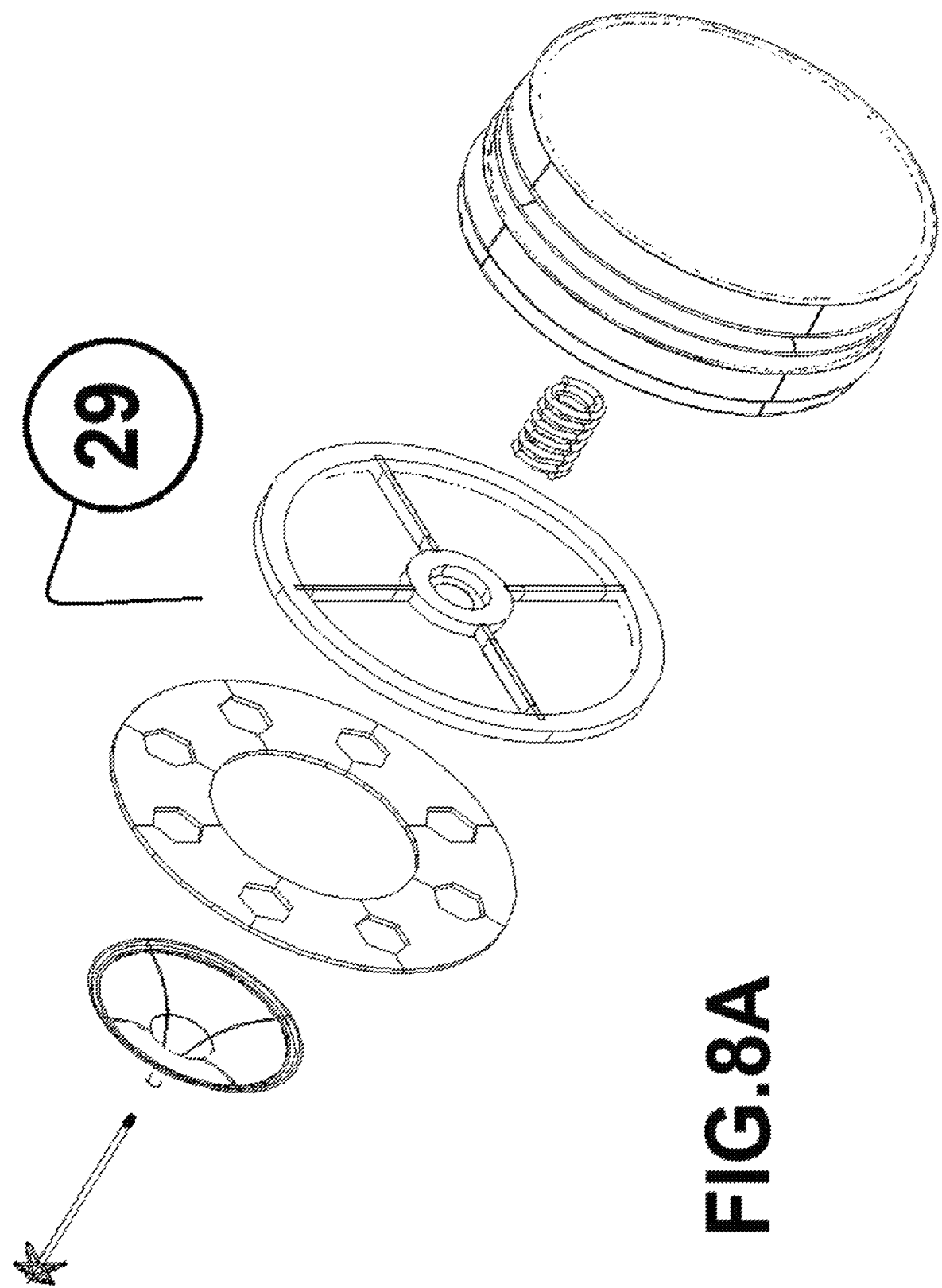
Figure 8B:
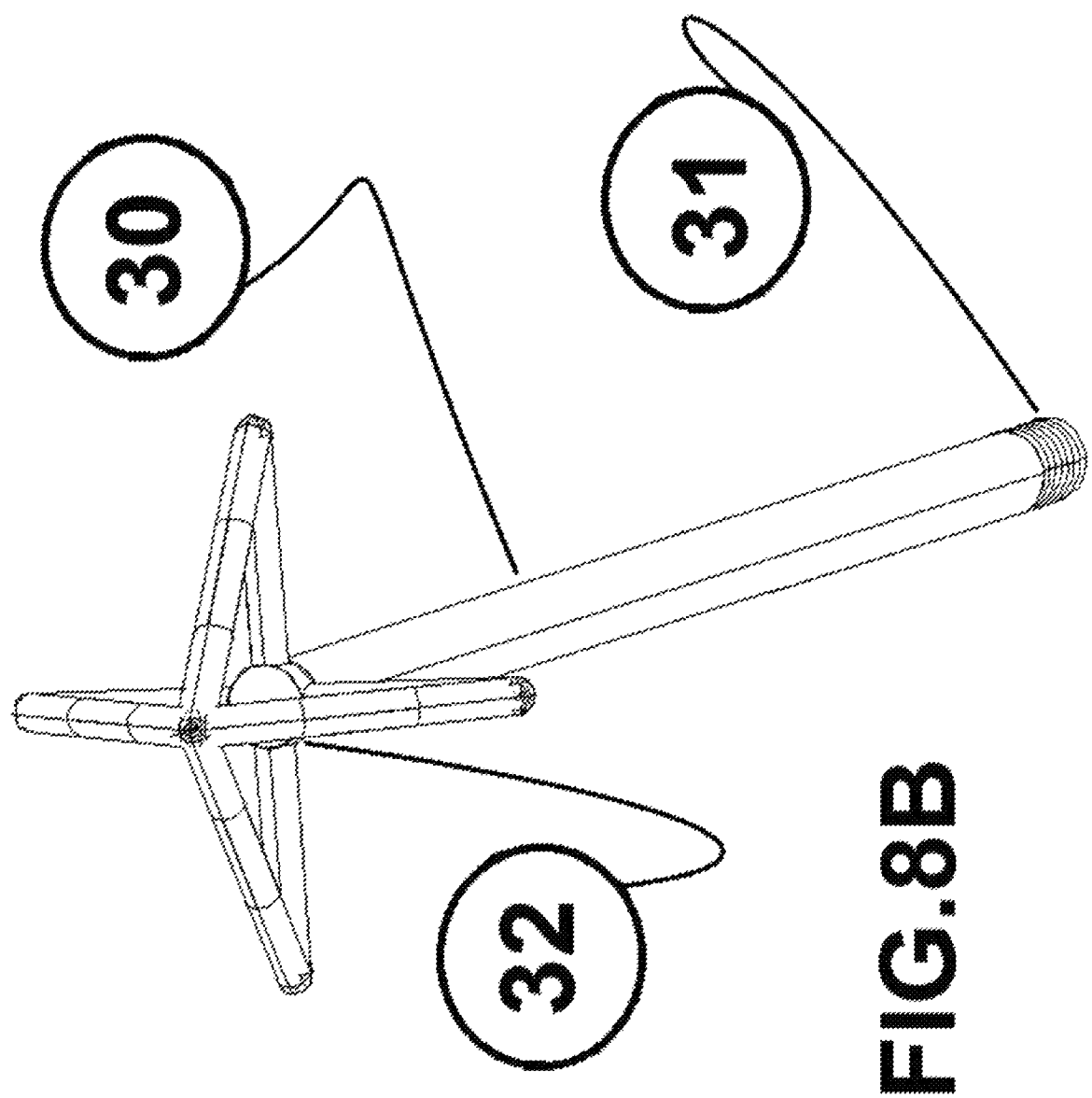
Figure 8C:
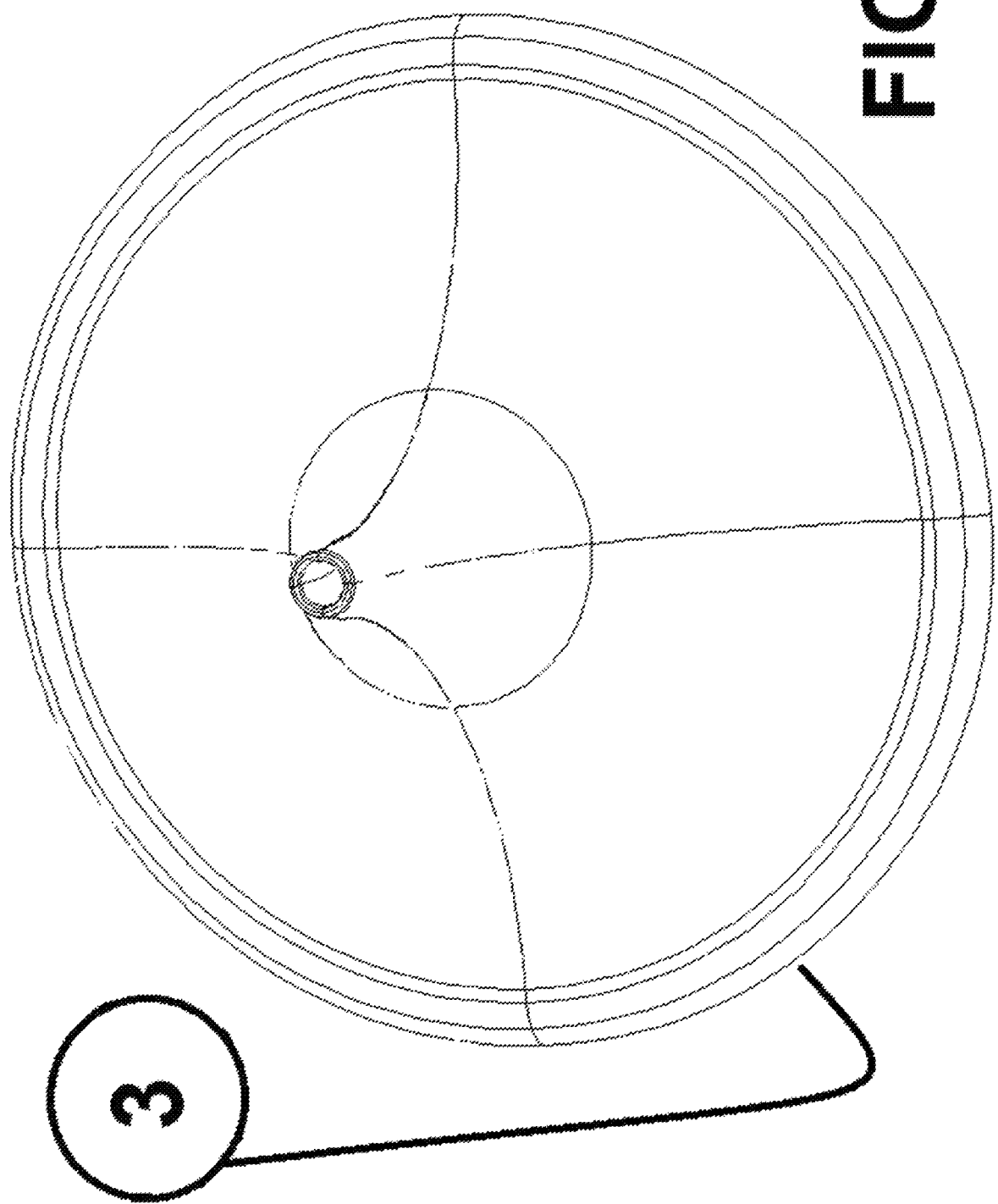
Figure 8D:
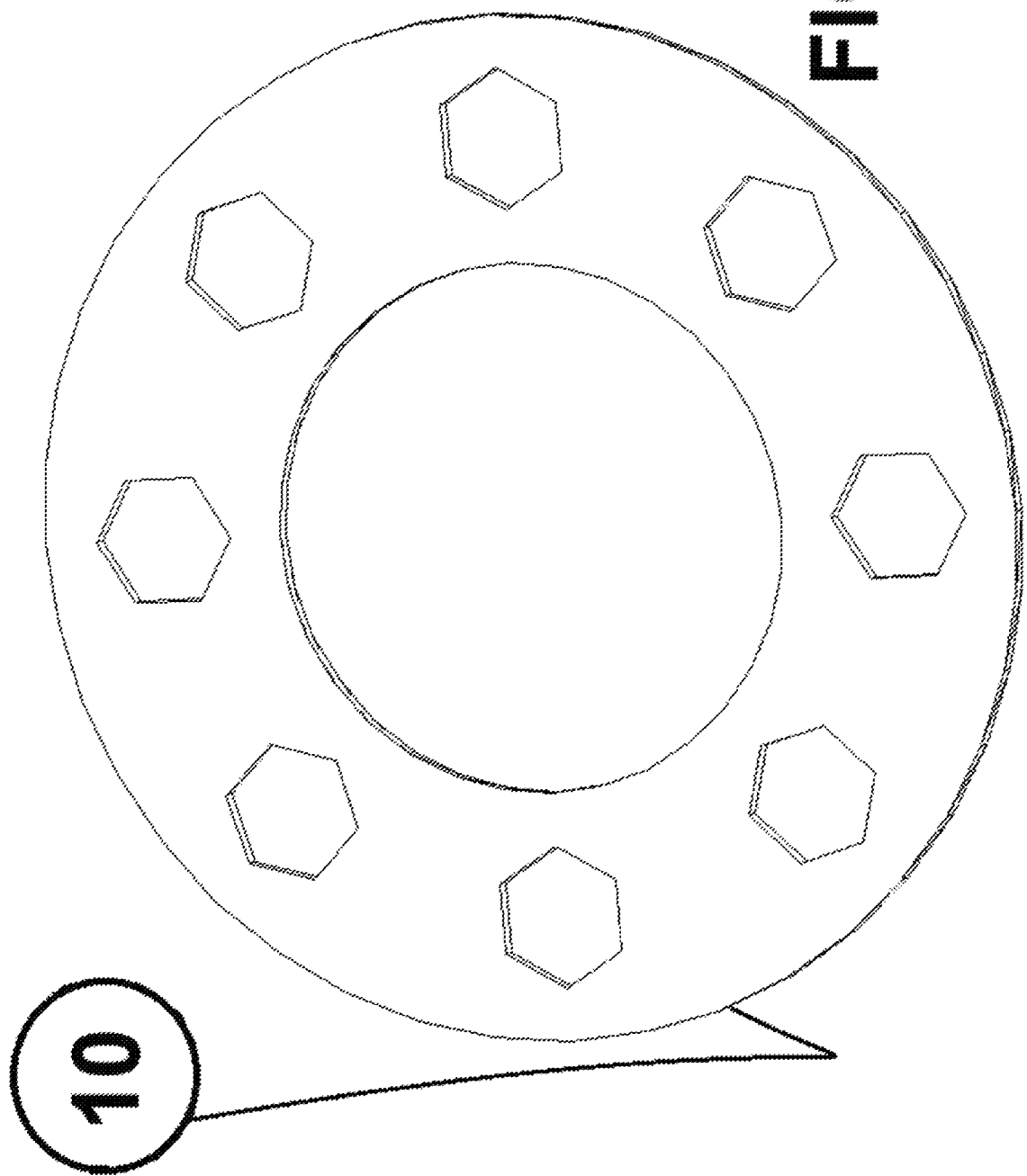
Figure 8E:
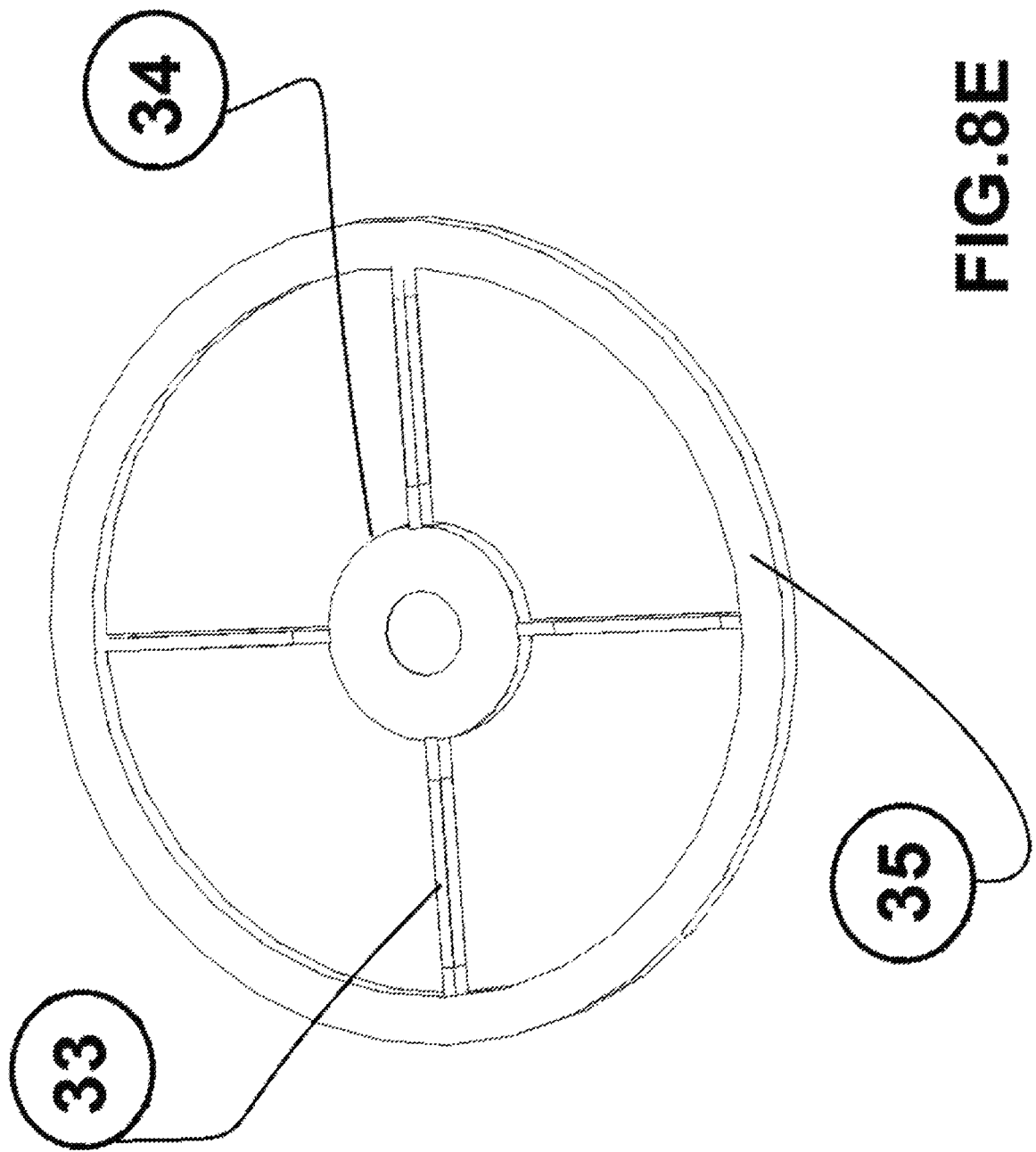
Figure 8F:
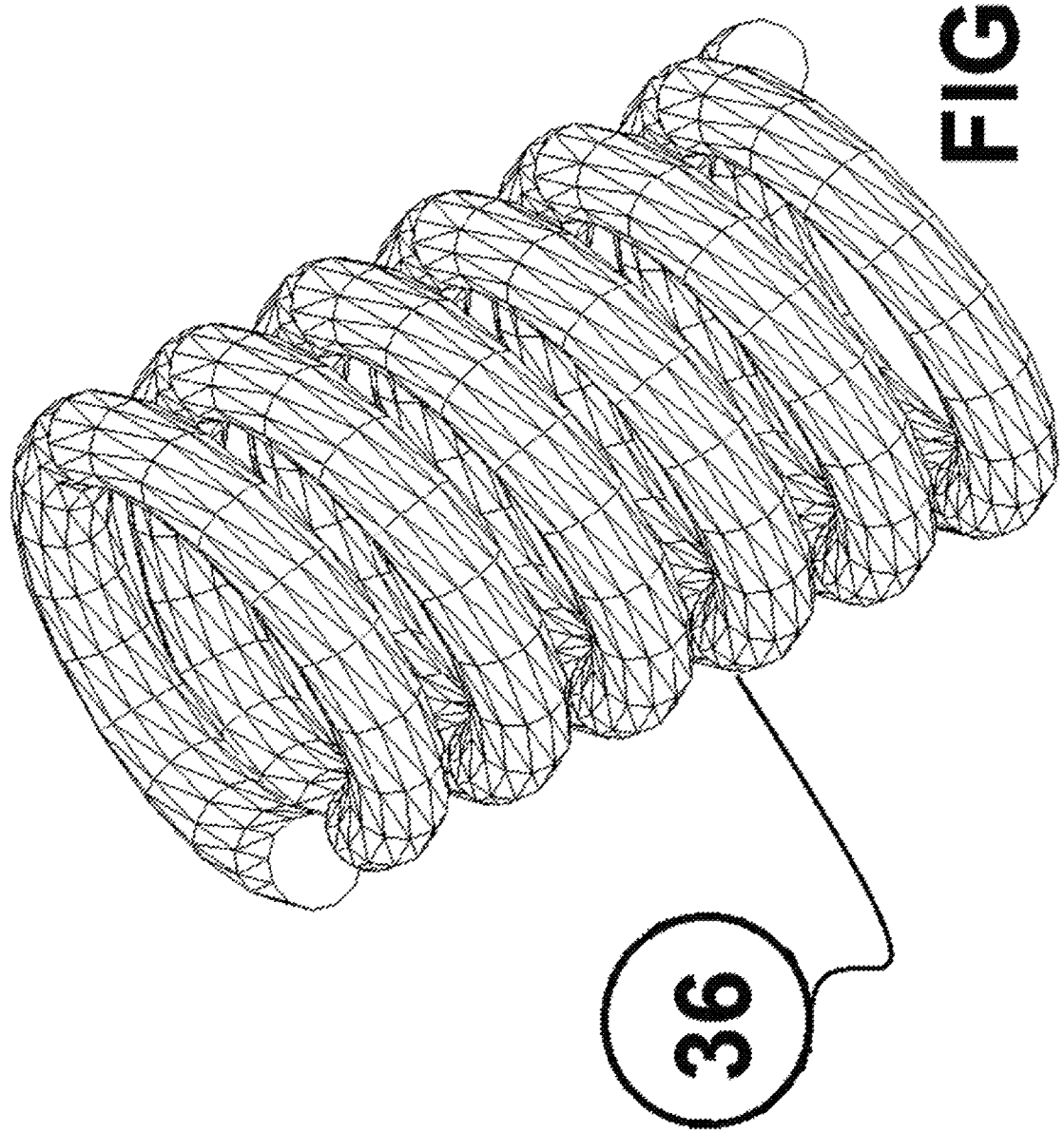
Figure 8G:
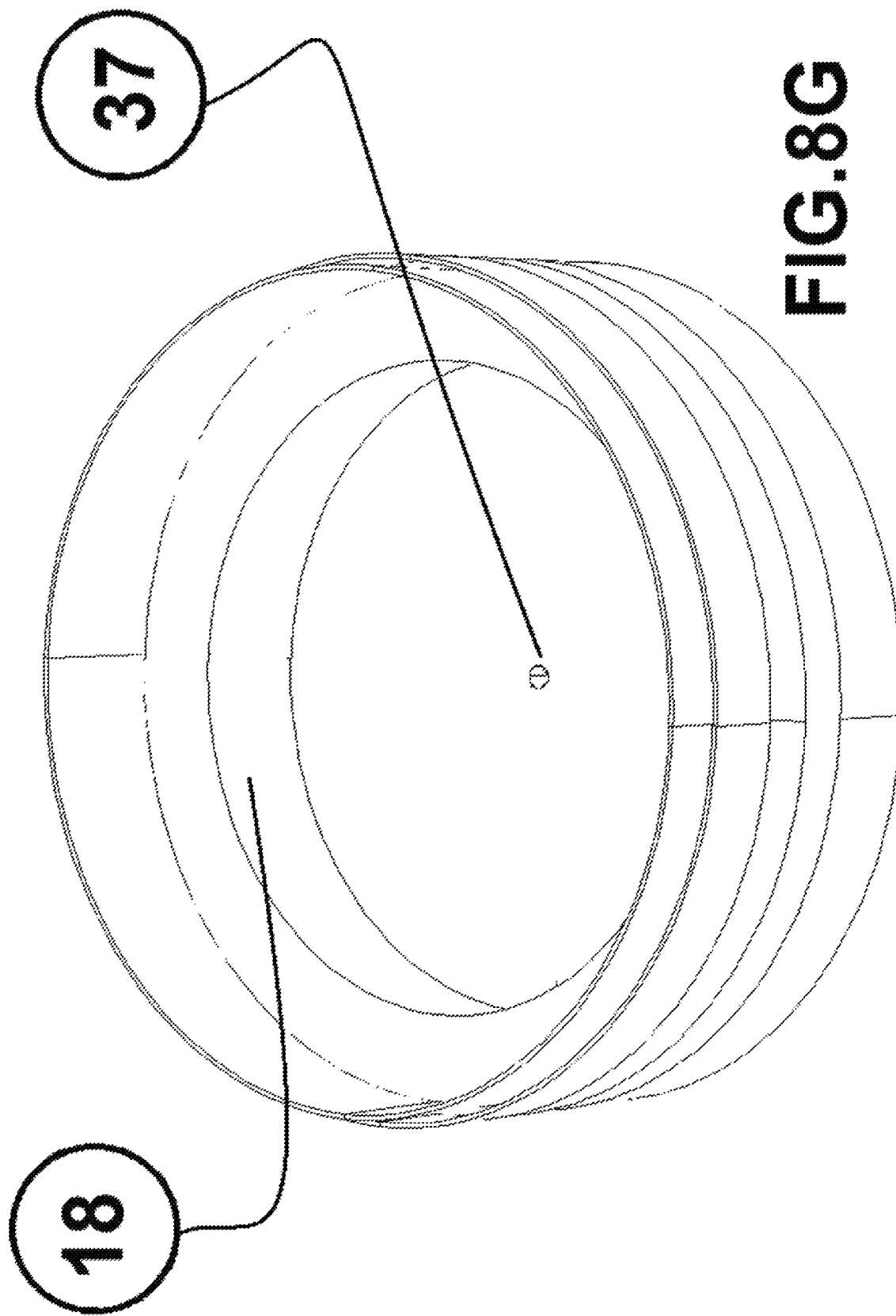
Figure 8H:
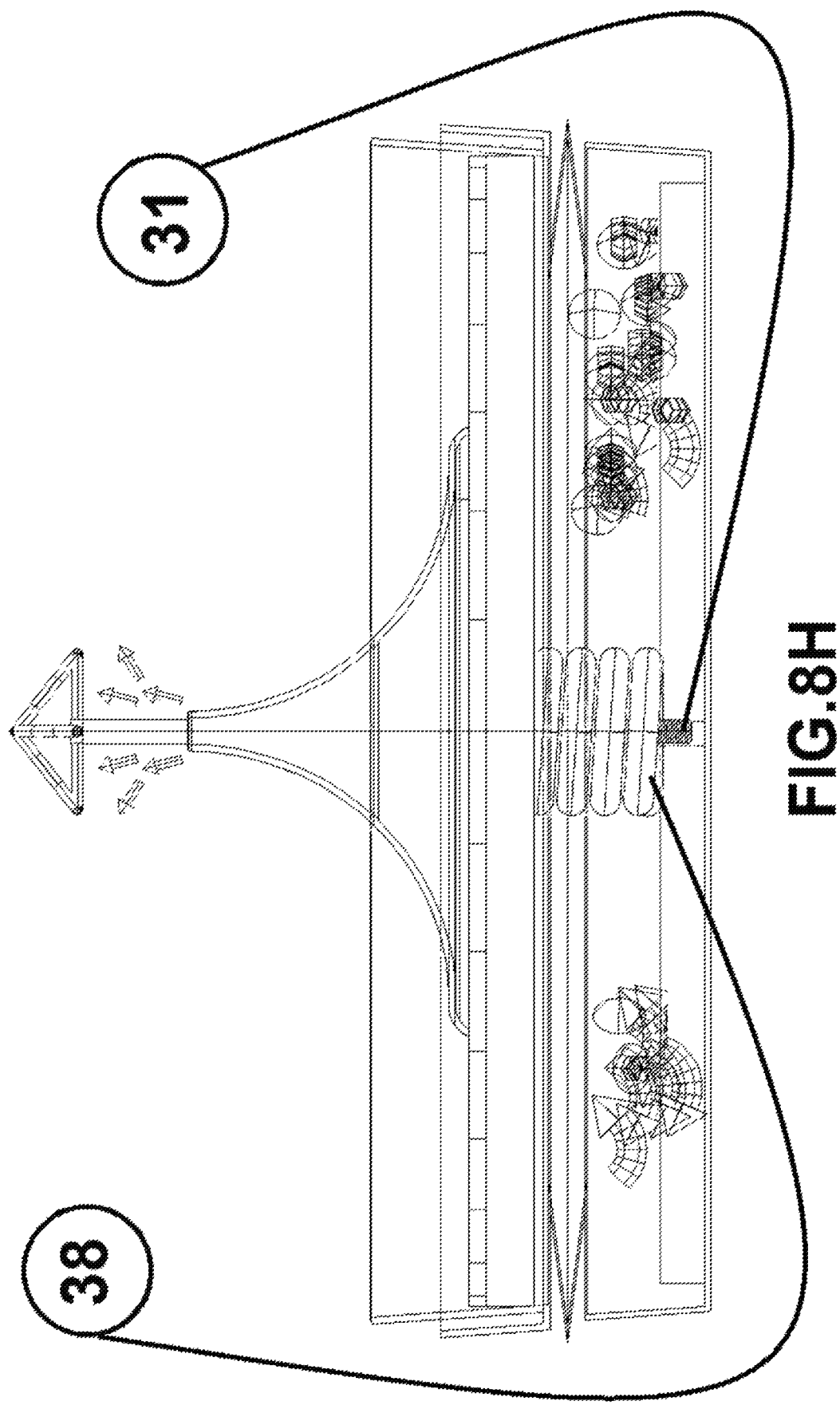
Figure 8I:
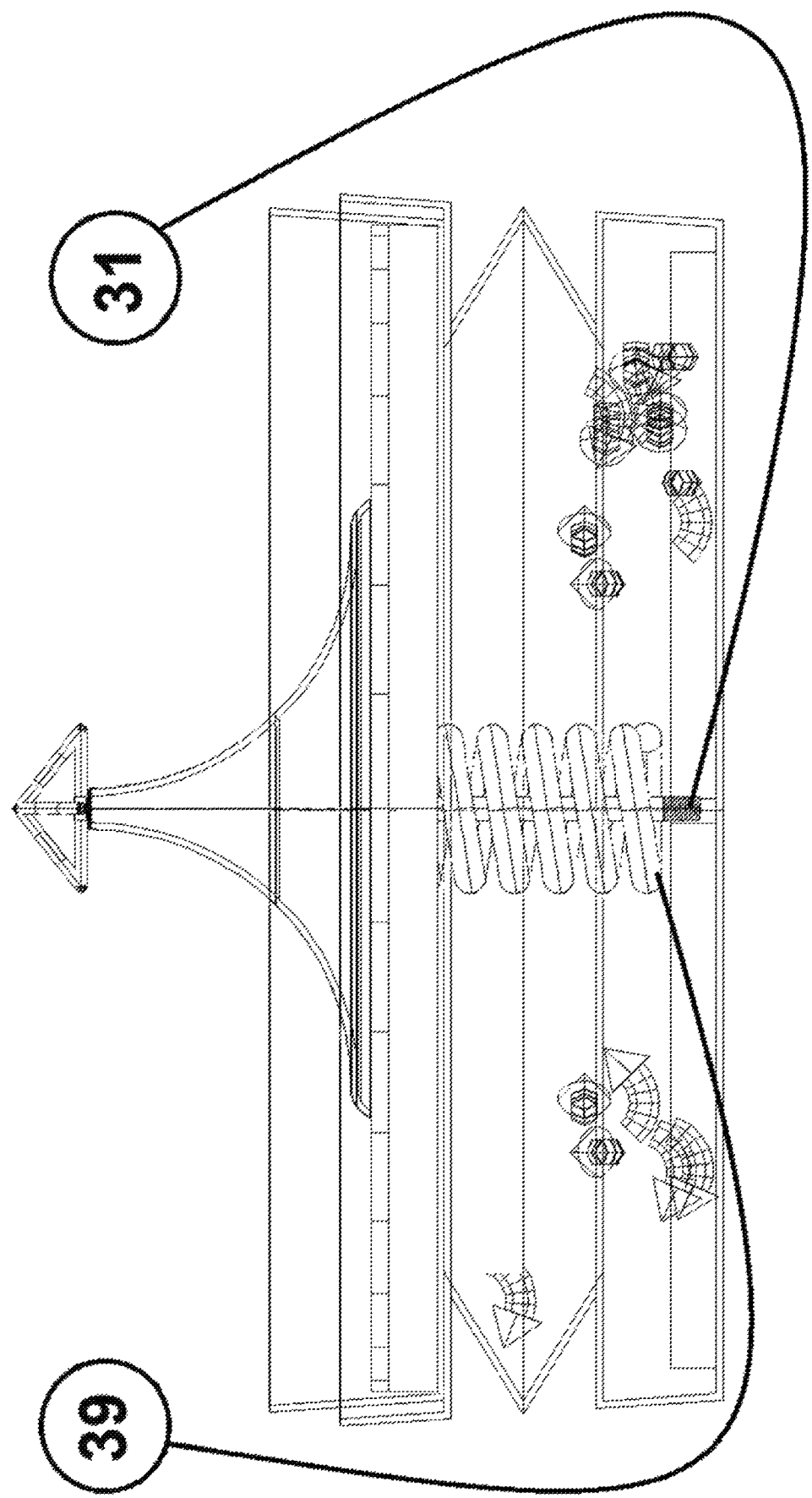
Figure 8J:
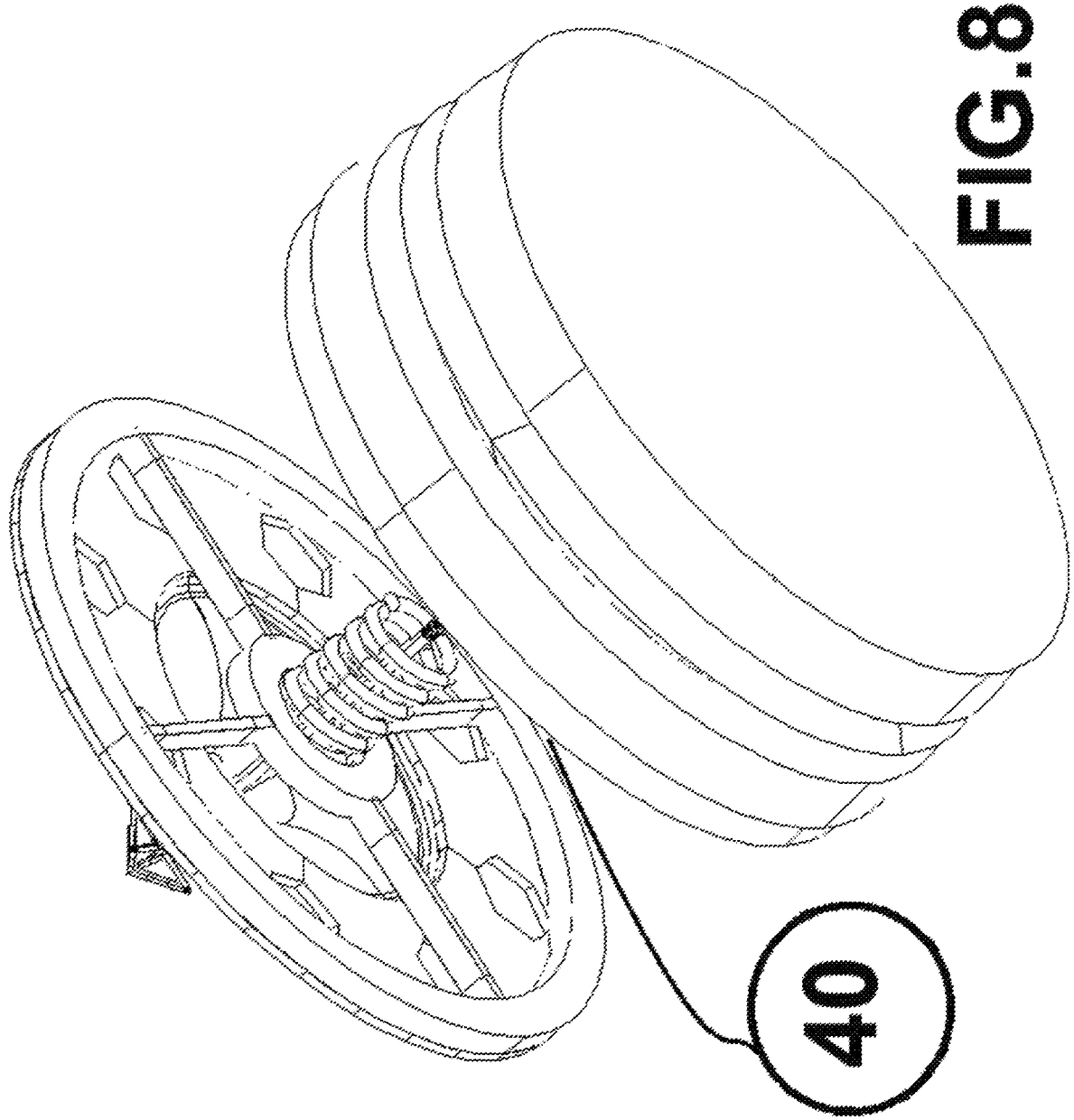
Figure 8K:
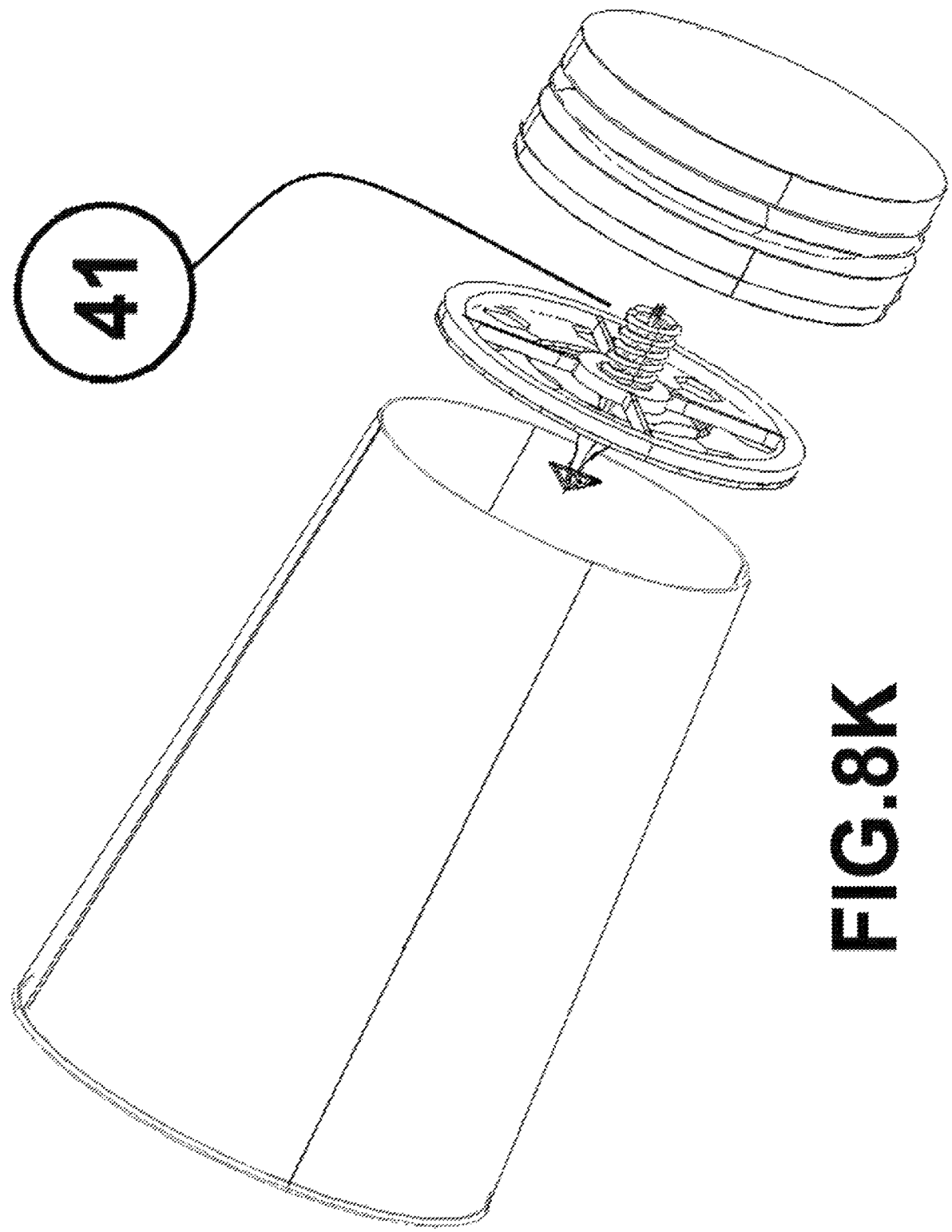
Figure 8M:
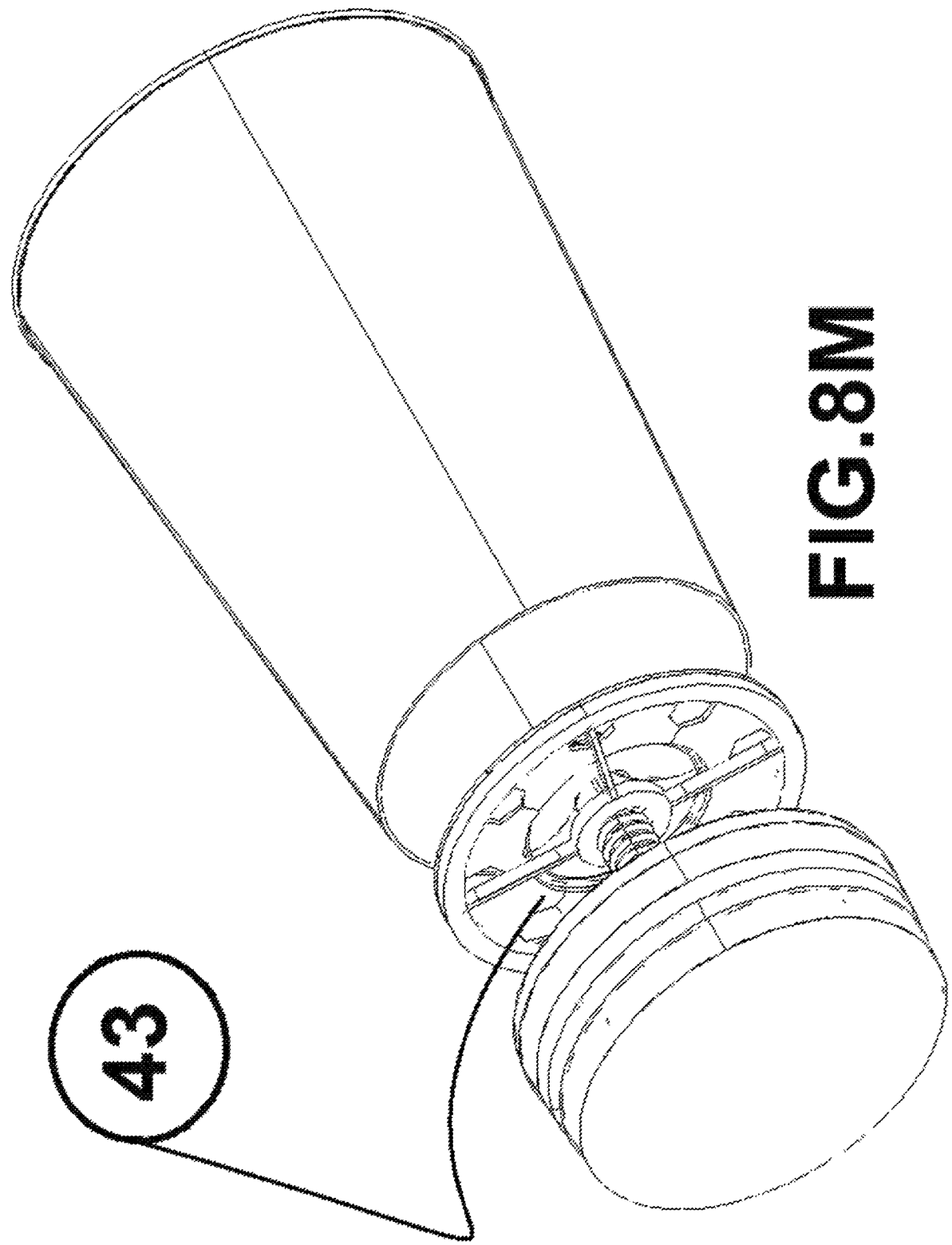

FIGS. 8A-8M shows another embodiment of this invention. FIG. 8A shows an exploded view 29 of a compressible cavity body 1, single level platform 10 and nozzle 3. FIG. 8B shows a retaining pin fastener 30 designed uniquely for the container's bottom unit components. The Pin 30 screws into the container bottom. And the other components work simultaneously in an upward and downward on the pin's vertical stationary bottom threaded end 31. Stopper 32 is designed to prevents drawback force from spring-loading that locates in small depressions surface such as nozzle 3. FIG. 8C shows a nozzle 3. FIG. 8D illustrates a single level platform 10, which operates similarly to other single level platforms discussed herein. FIG. 8E shows a circular support crate 33 designed to support the platform connected to pressurized springs 36. The center of support crate 33 is a section abutted by the spring 66 intended to hole the spring 66 steady through compression and decompression. Additionally, support crate 33 has an offset extrusion rim 35 on the crate's edges for the platform 10/11 swivel bottom area piece that is supported beneath the crate space to maneuver or rotate in the tight space. FIG. 8F shows a spring 36 that enables a stronger, faster return after compression is removed. Spring 36 produces constant force to return the compressible cavity body from a compressed state to an uncompressed state. FIG. 8G shows a top perspective sectional view inside the compressible cavity body 1, container bottom, and convolution walls 18. Convolution walls 18 remain flat in an uncompressed state. Container bottom includes a threaded pin hole 37 for pin 30 to fasten all components onto the container bottom. FIGS. 8H and 8I illustrate the connected pin 30/pin hole 37. FIG. 8H's view 38 shows a transparent portion view of the bottom parts of the container in a compressed state whereas FIG. 8I's view 39 show the same bottom parts of the container in an uncompressed state. FIG. 8J shows a component-level exploded view 40 of the bottom parts of the container tilted at an angle 40. FIG. 8K shows a component-level exploded view 41 of the entire container tilted at an angle. FIG. 8L shows a horizontal component-level exploded view 42 of the container. FIG. 8M shows a component-level exploded view 43 of view 42 from a different angle.

Figure 8N:
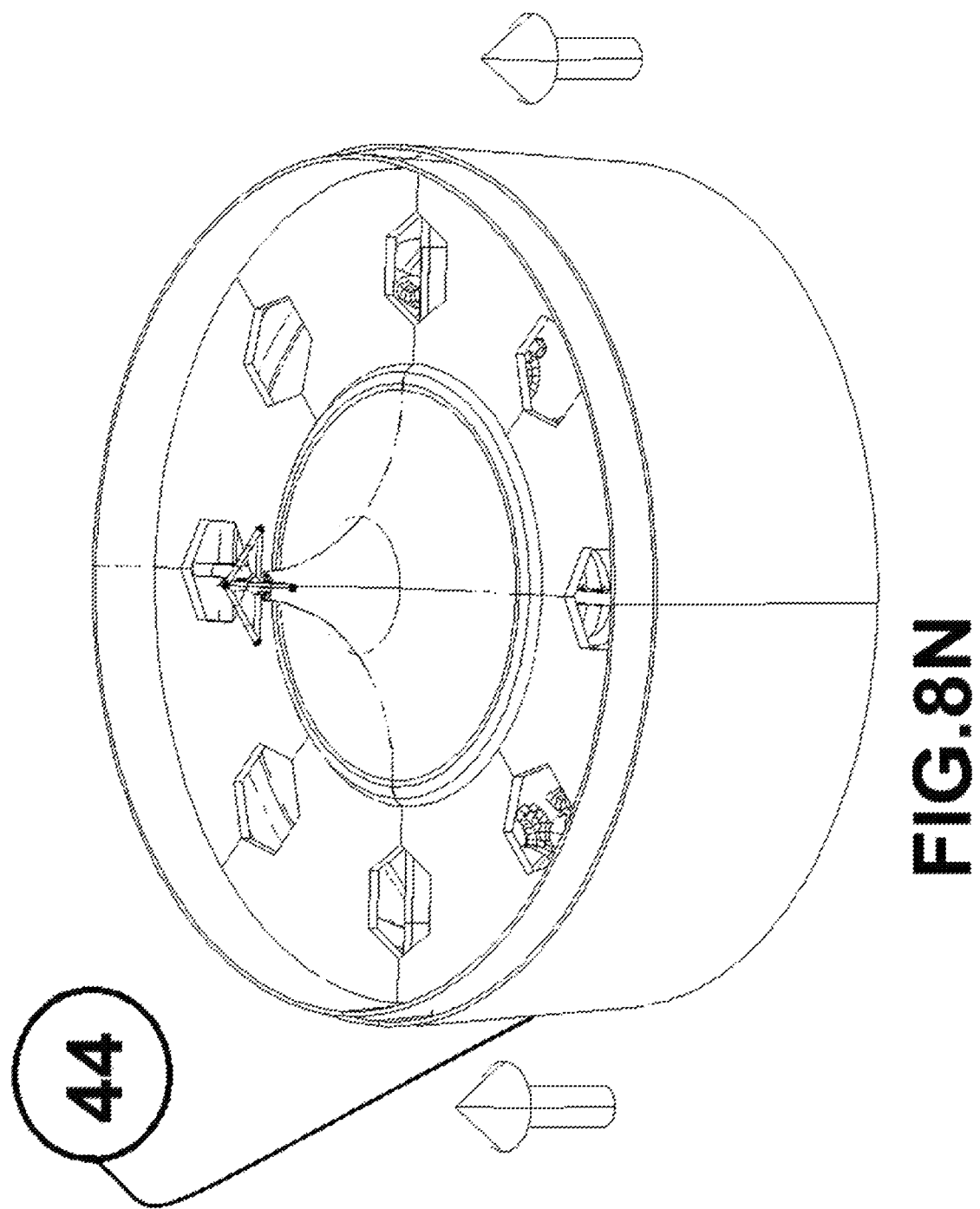
Figure 8P:
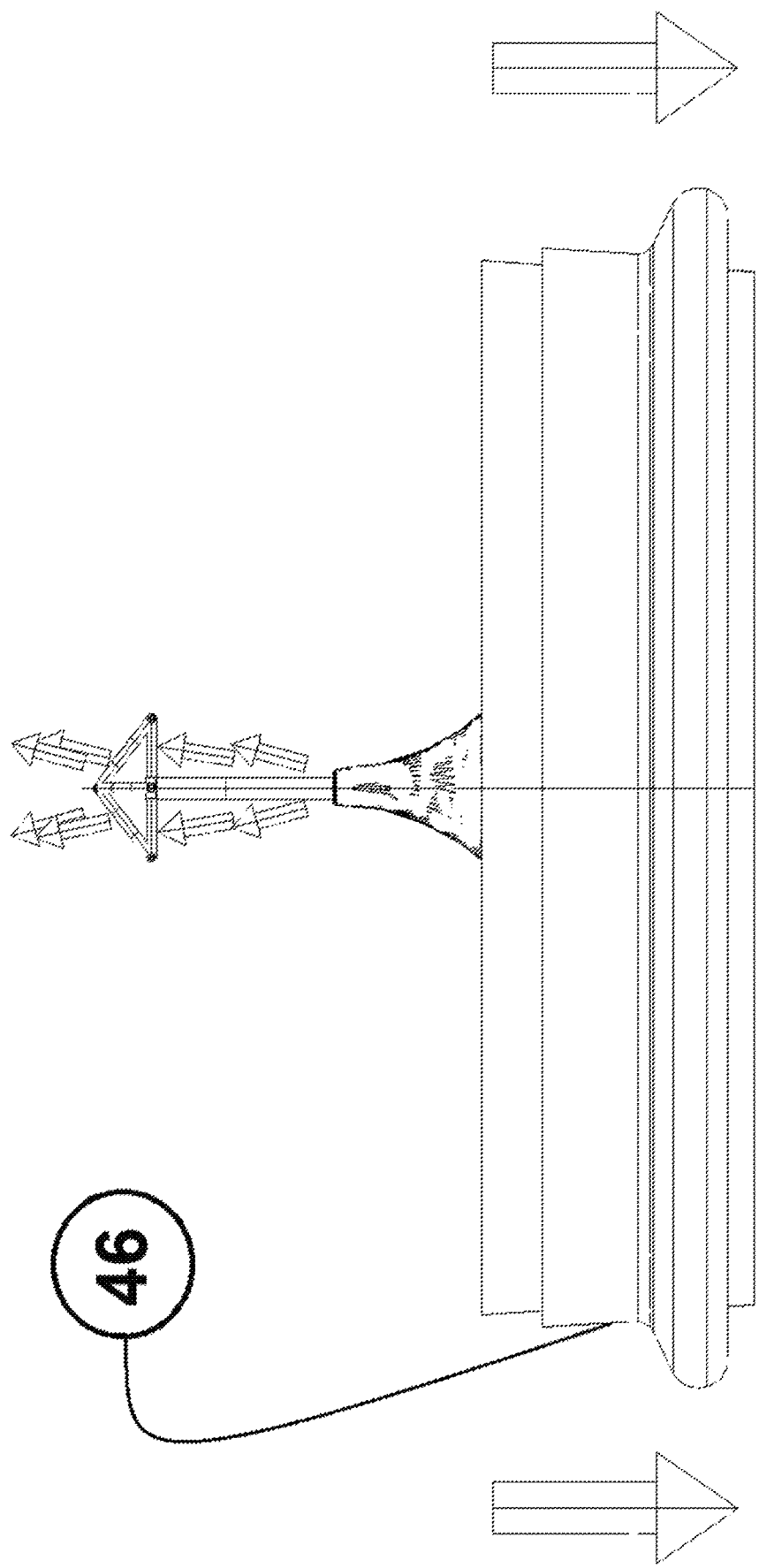
Figure 8Q:
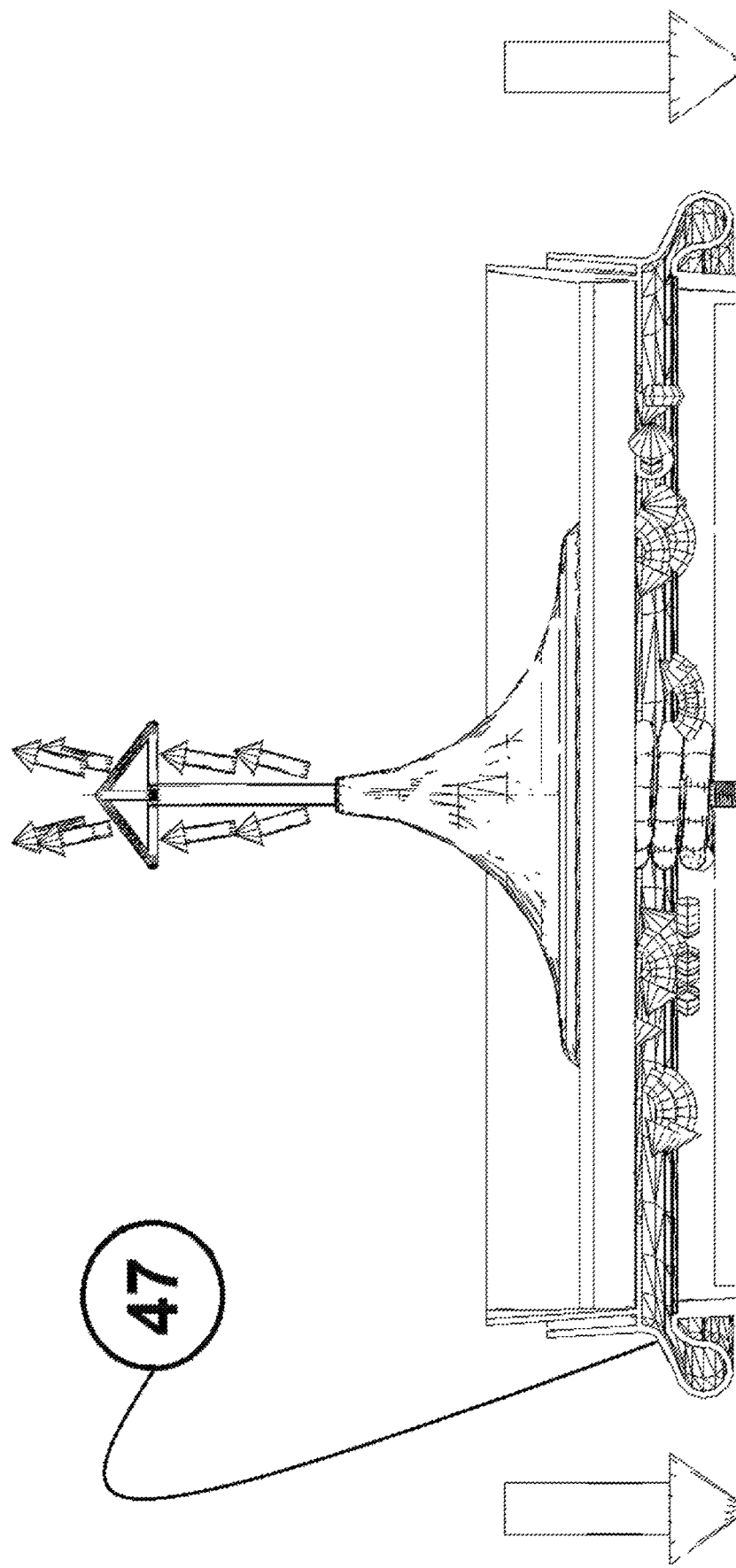

FIGS. 8N-8Q show another embodiment with a floppy convolution wall. FIG. 8N shows a perspective view 44 of the compressible cavity body 1 with a floppy straight walls 44 in an uncompressed state. The material for the floppy straight walls can be made from firm flexible rubber or silicone. FIG. 8O shows a transparent detailed view of the floppy straight walls 45 in an uncompressed state. FIG. 8P Illustrates floppy straight wall convoluted under a state of compression 46. FIG. 8Q Illustrates a transparent detailed view of the floppy straight wall convoluted under a state of compression 47. The convolution is in the shape of a round convex curve form.

An object of the present invention to reduce loose items that are meant for stirring or mixing such as spoons, straws, stir sticks and also electric mixer coffee containers. And the other alternative for this present invention related purposes to these items that are meant to clean food and parts like for example the small metal parts washer unit and fruit sterilizer cleaner washer. This present invention can by controlled unaided with hand pressure.

Below non-limiting variations of the embodiments discussed above are considered within the scope of the invention. Although a circular platform is shown, it can also be square or other geometric shape to correspond to the container shape. The single and double level platforms with swivel axle and nozzle can be devices of elastic polymeric material formed from the group consisting of rubber materials, polymeric material formed from the group consisting of plastic materials, stainless steel material is formed from the group consisting of metal materials, and wood material is formed from the group consisting of porous and fibrous structural tissue materials. The ease of attachment of the nozzle allows for changing different colors nozzles and different materials of nozzles. Additionally, the compressible cavity body can be polymeric material is formed from the group consisting of plastic materials. The convolution walls can be elastic polymeric material is formed from the group consisting of rubber materials or can be made from firm flexible rubber, silicone, plastic, or polymers. The liquid reservoir can be formed from glass materials is formed from the group consisting of sodium silicate materials.

In this application, the following terms will be understood to have the indicated definitions:

Stress force Flow—this present invention produces a jet plume convergent and divergent pressure within its platform and nozzle. The $(P, 0')$ and $(T, 0)$=[pressure and temperature upstream flow]. The nozzle uniquely qualifies as non-calibrated orifice flow, because the unique designed nozzle is not supported by any engine power entity on the part but can perform with only physical hand pressure.

Liquid—multiple liquid agents can be used for forced circulation mixing in the present invention. The platforms or plates and nozzle can circulate hydrogen oxide ($H_2O$) milk, tea with additives, wine, mix alcohol beverage, and coffee with additives for its oral liquid beverage consumers. The present invention can be used for cleaning applications in its container. Its platforms or plates and nozzle can produce convergent stress force pressure for cleaning small foods or small metal parts. The present invention is designed to handle strong cleaning liquid solutions on items used in its container.

The invention claimed is:

1. A mixing system for liquid in a container, the system comprising:
a container including a liquid reservoir, a platform, a compressible cavity body, and a container bottom;
the liquid reservoir defined by side walls and configured to hold a volume of liquid in a fully assembled and filled container;
the platform being inside of the container, below the liquid reservoir, and above the container bottom, the platform comprising a nozzle and release holes both fluidly connecting the liquid reservoir to the compressible cavity body; and
the compressible cavity body including walls with a convolution area and disposed between the container bottom and the platform and separated from the liquid reservoir,
wherein an upward force on the container bottom brings the container bottom closer to the platform compressing the compressible cavity body and forcing liquid within the compressible cavity body up through the nozzle and release holes into the liquid reservoir and a removal of the upward force causes the compressible cavity body to return to an uncompressed state and refill with liquid from the liquid reservoir.

2. The mixing system for liquid in a container of claim 1, wherein the release holes have adjustable size orifices to regulate an amount of fluid flowing through the nozzle during compression and an amount of backflow while returning to the uncompressed state.

3. The mixing system for liquid in a container of claim 1, the system further comprising a spring in the compressible cavity body mechanically connecting the container bottom and the platform that compresses upon the upward force being applied and expands upon the upward force being removed.

4. The mixing system for liquid in a container of claim 3, the system further comprising a pin that attaches to the container bottom and extends upward through the nozzle and has a stopper on a nozzle end of the pin.

5. The mixing system for liquid in a container of claim 1 wherein the walls with convolution areas encompassing the compressible cavity body are flat in an uncompressed state and structurally yield forming at least one convolution upon the upward force being applied.

6. The mixing system for liquid in a container of claim 5, wherein the at least one convolution is bellow-like.

7. The mixing system for liquid in a container of claim 1, wherein the platform sits on a ledge extending inward from the walls above the convolution area.

8. The mixing system for liquid in a container of claim 2, the platform comprises an upper-level plate and a lower-level plate, each with the release holes that fluidly connect the liquid reservoir with the compressible cavity when aligned across the upper-level plate and the lower-level plate and fluidly disconnect the liquid reservoir from the compressible cavity body when a plate from one level fully obstructs the release holes of a plate from another level.

9. The mixing system for liquid in a container of claim 8, wherein a rotation of the plate from one level relative to the another level causes a change in the adjustable size orifices.

10. The mixing system for liquid in a container of claim 9, wherein the upper-level plate and the lower-level plate are sandwiched together by a swivel axle.

11. The mixing system for liquid in a container of claim 1, the platform is removeable from the container for cleaning and adjustment of the adjustable size orifices and reinsertable into the container.

12. The mixing system for liquid in a container of claim 1, the compressible cavity body and the liquid reservoir each have screw threads, and the compressible cavity body is removeable by unscrewing from the liquid reservoir.

13. The mixing system for liquid in a container of claim 1, wherein a collective aperture area of all of the release holes is sized relative to an aperture of the nozzle so that the liquid in the compressible cavity body during compression forcefully exits into the liquid reservoir through the aperture of the nozzle and in an uncompressed state the release holes allow for backflow from the liquid reservoir back into the compressible cavity body.

14. The mixing system for liquid in a container of claim 1, wherein the nozzle is located in the center of the platform and the release holes are positioned radially around the nozzle on the platform.

15. The mixing system for liquid in a container of claim 1, wherein the walls with convolution areas are vertically flat in an uncompressed state and not flat in a compressed state.

16. The mixing system for liquid in a container of claim 15, wherein
each convolution of the convolution areas is a rounded convex shape in a compressed state, and the material is at least one of floppy, flexible or elastic.

17. A method of assembling a container capable of mixing liquid, the method comprising:
providing a pin with a stopper, a nozzle, a platform including release holes, a spring stabilizing piece, a compression spring, a container bottom attached to walls with convolution areas, and a liquid reservoir;
holding the stopper and inserting the pin through the nozzle, the platform, the spring stablizing piece and the compression spring;
fastening a portion the pin extending beyond the compression spring to the container bottom at a centerpoint to form a compressible cavity body; and
attaching the compressible cavity body to the liquid reservoir to create the container.

18. The method of assembling a container capable of mixing liquid according to claim 17, further comprising a step of assembling the platform with an upper-level plate and a lower-level plate sandwiched together between a swivel axle.

19. The method of assembling a container capable of mixing liquid according to claim 17, wherein the spring stabilizing piece is a support crate or a swivel axle.

20. The method of assembling a container capable of mixing liquid according to claim 17, further comprising marking sidewalls of the liquid reservoir with a maximum fill line at a position below the top of the container.

\* \* \* \* \*